(12) United States Patent
Hayes et al.

(10) Patent No.: US 12,337,713 B2
(45) Date of Patent: Jun. 24, 2025

(54) FIELD WEAKENING ON-BOARD AC CHARGERS IN VEHICLES CONNECTED TO AN AC POWER SOURCE

(71) Applicant: BAE Systems Controls Inc., Endicott, NY (US)

(72) Inventors: Orion M. Hayes, Binghamton, NY (US); Nicholas A. Lemberg, Endwell, NY (US)

(73) Assignee: BAE Systems Controls Inc., Endicott, NY (US)

(*) Notice: Subject to any disclaimer, the term of this patent is extended or adjusted under 35 U.S.C. 154(b) by 77 days.

(21) Appl. No.: 18/485,653

(22) Filed: Oct. 12, 2023

(65) Prior Publication Data

US 2025/0121724 A1 Apr. 17, 2025

(51) Int. Cl.
| | | |
|---|---|---|
| B60L 53/62 | (2019.01) | |
| B60L 53/22 | (2019.01) | |
| B60L 53/30 | (2019.01) | |
| B60L 53/66 | (2019.01) | |
| H02J 7/00 | (2006.01) | |

(52) U.S. Cl.
CPC .............. B60L 53/62 (2019.02); B60L 53/22 (2019.02); B60L 53/305 (2019.02); B60L 53/66 (2019.02); H02J 7/0047 (2013.01); B60L 2210/30 (2013.01)

(58) Field of Classification Search
CPC ..................................................... B60L 53/62
USPC ......................................................... 320/108
See application file for complete search history.

(56) References Cited

U.S. PATENT DOCUMENTS

| | | | |
|---|---|---|---|
| 11,052,782 B1* | 7/2021 | Lemberg | ................ B60L 53/22 |
| 11,766,948 B1 | 9/2023 | Abrams | |
| 2005/0269999 A1 | 12/2005 | Liu et al. | |
| 2008/0094013 A1 | 4/2008 | Su | |
| 2012/0019212 A1 | 1/2012 | Krauer | |
| 2015/0311739 A1* | 10/2015 | Schillinger | ......... H02M 1/4216 |
| | | | 320/137 |
| 2016/0329851 A1 | 11/2016 | Borisov et al. | |
| 2017/0294853 A1* | 10/2017 | Flannery | ............... H02M 7/483 |
| 2018/0175742 A1* | 6/2018 | Lapassat | ............... H02M 7/493 |
| 2019/0077270 A1* | 3/2019 | Nieto | ...................... B60L 53/53 |
| 2020/0238844 A1 | 7/2020 | Grace et al. | |

(Continued)

FOREIGN PATENT DOCUMENTS

| | | |
|---|---|---|
| EP | 3549812 A1 | 10/2019 |
| WO | 2013100559 A1 | 7/2013 |
| WO | 2021/206735 A1 | 10/2021 |

OTHER PUBLICATIONS

International Search Report, PCT/US24/50406, mailed Dec. 11, 2024, 12 pages.

(Continued)

*Primary Examiner* — Jerry D Robbins
(74) *Attorney, Agent, or Firm* — Scully Scott Murphy & Presser PC; Gary McFaline

(57) ABSTRACT

Charging apparatus and systems are provide for charging an energy storage system in respective vehicles using grid power where the vehicles are connected to the same transformer. The apparatus and system coordinate the charging and may use field weakening techniques to reduce a peak line-line voltage when a need is determined based on a minimum energy storage system voltage of the vehicles connected to the same transformer.

20 Claims, 12 Drawing Sheets

(56) References Cited

U.S. PATENT DOCUMENTS

| | | |
|---|---|---|
| 2020/0290474 A1 | 9/2020 | Cashdollar et al. |
| 2021/0086647 A1* | 3/2021 | Kiessling ................. B60L 53/67 |
| 2023/0048351 A1* | 2/2023 | Spezie ..................... H02B 5/02 |
| 2024/0416779 A1* | 12/2024 | Boucher ............... H01M 10/46 |

OTHER PUBLICATIONS

International Preliminary Report on Patentability dated Oct. 6, 2022 received in International Application No. PCT/US2020/027781.

* cited by examiner

FIELD WEAKENING ON-BOARD AC CHARGERS IN VEHICLES CONNECTED TO AN AC POWER SOURCE

FIELD OF THE DISCLOSURE

This disclosure related to charging vehicles such as hybrid or electric vehicle where the on-board power conversion equipment is used to charge the energy storage system directly from an AC power source. More particularly, this disclosure relates to coordination of charging multiple vehicles in a charging group connected to an external AC power source using the on-board vehicle power converter as the charger.

BACKGROUND

Electric vehicles and hybrid-electric vehicles have an electric energy storage system (ESS). The industry standard is to provide charge power to the ESS by connecting an external DC charger to the vehicle. The DC Charger performs power conversion from AC to DC with input from an AC power source and output to the vehicle DC-Link. Electric vehicles have electric power converters to perform DC to AC conversion for vehicle propulsion. Electric vehicle power converters may also perform AC to DC conversion for regenerative braking.

U.S. Pat. No. 11,052,782 describes using the on-board power converter as an on-board charger which may be connected directly to an external AC power source. However, there can be a problem where a passively rectified grid voltage overlaps with the energy storage system voltage range (V_LLRMS*sqrt (2)>Vbattery_min). This problem may result from using a phase AC power source such as a utility grid. For example, a 277/480V AC input power will be passively rectified to 679 Vdc. Electric vehicle ESS voltage primarily varies based on state-of-charge (SoC). Thus, an electric vehicle charger must be able to vary the output DC voltage to charge the ESS at low SoC voltage as well as high SoC voltage. U.S. Pat. No. 11,052,782 resolves this problem using field weakening. The field weakening is based on a comparison of a peak line-line voltage V_LL with a real time ESS voltage (V_ESS). Field weakening enables the charger controller to inject reactive current into the AC input power reactance. Field weakening decreases the V_LL of the AC input thus reducing the rectifier output DC voltage.

However, if multiple vehicles are connected to the same external AC input power source, each vehicle may or may not have the same real time ESS voltage. Additionally, different vehicles may be connected or disconnected to the same external power source during charging. Once again, further causing different real time ESS voltages. This disclosure describes the control of one on-board chargers actively rectifying AC input to charge an electric vehicle ESS, and the control of multiple on-board chargers working in parallel across multiple electric vehicles.

SUMMARY

Accordingly, this disclosure relates to charging multiple vehicles directly from an AC power source where each vehicle has an on-board charger. This eliminates the eliminating redundant external DC charger and associated off-board power conversion equipment. This disclosure relates to the control and coordination of charging across multiple on-board chargers working in parallel in multiple vehicles, respectively. This coordination achieves the field weakening to charge the multiple vehicles, as needed.

For example, disclosed is an apparatus associated with a charging depot. The charging depot comprises a transformer and a plurality of charging ports. A plurality of vehicles may respectively connect to the charging depot to charge respective energy storage devices using power from the transformer via a switchgear. the plurality of vehicles may form a charging group. Each vehicle comprises an on-board AC charger. The apparatus may comprise a communication interface and a processor. The processor may be configured to receive, from the on-board AC charger in at least two vehicles which are connected to the same transformer, a real-time DC voltage of a respective energy storage system of the at least two vehicles, determine based on the received DC voltages from the at least two vehicles, a minimum DC voltage among the energy storage system in each of the at least two vehicles and compare the determined minimum DC voltage with a peak line-line voltage (V_LL) associated with the transformer to determine whether field weakening is needed. When it is determined that field weakening is needed, the processor may be configured to calculate a reactive AC current to reduce the peak V_LL associated with the transformer to less than the determined minimum DC voltage; and transmit, to the on-board AC charger in the at least two vehicles, a value proportional to the calculated reactive AC current. The transmission and reception are via the communication interface.

In an aspect of the disclosure, the apparatus may further comprise a plurality of voltage sensors configured to detect a voltage at each of three-phases at the plurality of charging ports. The processor may be configured to determine the peak V_LL corresponding to the detected voltage. In other aspects, the on-board AC charger may comprise voltage sensors to detect voltages at terminals of conversion circuitry in the vehicle, respectively and the processor receives these detected voltages.

In an aspect of the disclosure, the apparatus receives the real-time DC voltage of the respective energy storage system of the at least two vehicles while each energy storage system is coupled to the transformer. This allows for the apparatus to repeatedly determine the minimum DC voltage, whether field weakening is needed, the calculation of the reactive AC current and the transmission of the value proportional to the calculated reactive AC current based on current DC voltages, received.

In an aspect of the disclosure, the value proportional to the calculated reactive AC current may be the same for each of the at least two vehicles.

In an aspect of the disclosure, when an additional vehicle connects to one of the charging ports, prior to charging, the real-time DC voltage of the energy storage system in the additional vehicle may be received by the apparatus. In this aspect, the processor may repeat the determination of the minimum DC voltage, whether field weakening is need, calculation of the reactive AC current, and the transmission of the value proportional to the calculated reactive AC current using the new real-time DC voltage received.

In an aspect of the disclosure, the processor may implement a proportional integral (PI) control to determine the reactive AC current to reduce the peak V_LL.

In an aspect of the disclosure, the communication interface may be a wireless communication interface.

In an aspect of the disclosure, the apparatus may be located in the charging depot.

In an aspect of the disclosure, the charging depot may have a plurality of transformers and a plurality of sets of charging ports, respectively. A plurality of set of vehicles may connect with the sets of charging ports, respectively, via respective switchgears. Each set of vehicles may form a different charging group. Each charging group may comprise vehicles connected to the same transformer. In this aspect, the processor may be configured to calculate the reactive current needed for each charging group based on real-time voltage of the energy storage system in the vehicles in the respective sets and the peak V_LL associated with the respective transformer.

Also disclosed is an on-board charging system for a vehicle. The vehicle may be connected to a transformer in a charging depot via a switchgear (and ports). The charging depot has a plurality of ports for vehicles. The transformer may supply phase AC for charging the energy storage system in the vehicle such as three-phase. The vehicle may connect to a port via an AC charging cable. The on-board charging system may comprise an AC filter, conversion circuitry, voltage sensors and a communication interface. The AC filter may comprise an inductor. The AC filter may be coupled to each of the phases of AC. The conversion circuitry is coupled to the inductor of each AC filter. The conversion circuitry may be configured to convert the three-phase AC received at its input terminals into DC for a system DC bus and configured to supply an independently controllable real AC current and reactive AC current. The sensors may detect a voltage at each of the phases at the input terminals, respectively. The communication interface may be configured to be in electrical communication with at least one other vehicle in a charging group. The charging group may include vehicles coupled to the same transformer.

The on-board charging system also comprises a first processor and a second processor. The first processor may be configured to be set in an active fleet controller mode and/or an inactive fleet controller mode. When the first processor is set in the active fleet controller mode, the first processor is an active fleet controller. When the first processor is set to the inactive fleet controller mode, the second processor receives a command from the vehicle which is set as the active fleet controller. When the first processor is the active fleet controller, the second processor may be configured to close one or more switches associated with each phase when a condition is satisfied and determine the real-time voltage of the energy storage device in its own vehicle. The first processor may be configured to receive from the on-board charging system from the at least one other vehicle which are connected to the same transformer, a real-time DC voltage of a respective energy storage system of the vehicle, via the communication interface, determine a minimum DC voltage among the energy storage system in each vehicle connected to the same terminal based on the received real-time DC voltage and the determined real-time voltage of the energy storage device, determine a peak line-line voltage (V_LL) corresponding to the detected voltage at the input terminals of the conversion circuitry; and compare the determined peak V_LL with the minimum DC voltage to determine whether field weakening is needed. When it is determined that field weakening is needed, the first processor may be configured to calculate a reactive AC current to reduce the peak V_LL to less than the minimum DC voltage and transmit to the on-board charging system of the at least one other vehicle which are connected to the same transformer, a value proportional to the calculated reactive AC current via the communication interface. The second processor may be configured to cause a reactive AC current based on the calculated reactive AC current to be supplied by the conversion circuitry such that it flows through each inductor and transformer, reducing the peak V_LL.

In an aspect of the disclosure, the mode of the first processor may be set based on the timing when the vehicles in the charging group are connected to the plurality of ports. In other aspects, the ode of the first processor may be set based on the real-time voltage of each of the energy storage system of the vehicles in the charging group.

In an aspect of the disclosure, when the first processor is set in the active fleet controller mode, the second processor may be configured to transmit the real-time DC voltage of the energy storage system of the vehicle, via the communication interface, receive the value proportional to the calculated reactive AC current via the communication interface; and cause a reactive AC current based on the received proportional value to be supplied by conversion circuitry in the on-board charging system such that it flows through each inductor and transformer, reducing the peak V_LL.

In an aspect of the disclosure, the second processor may be configured to regulate a system DC bus voltage to substantially match the real-time voltage of the energy storage system after the reactive AC current is injected and control one or more switches associated with the energy storage system to close when the peak V_LL is less than the real-time voltage of the energy storage system and the system DC bus voltage substantially matches the real-time voltage of the energy storage system. The energy storage system may be charged after the control of the one or more switches.

In an aspect of the disclosure, when the first processor is set to the inactive fleet controller mode, the second processor may be configured to transmit the real-time voltage of the energy storage system while the energy storage system is charging. In an aspect of the disclosure, when the first processor is set to the active fleet controller mode, the first processor may receive the real-time voltage and repeat the determination of the minimum DC voltage, whether field weakening is needed, the calculation of the reactive AC current and the transmission of the value proportional to the calculated reactive AC current based on the received DC voltage.

In an aspect of the disclosure, when the first processor is set to the active fleet controller mode, the second processor may be configured to detect the real-time voltage of the energy storage system in the vehicle while the energy storage system is charging and the first processor is configured to repeat the determination of the minimum DC voltage, whether field weakening is needed, the calculation of the reactive AC current and the transmission based on the detected real-time voltage.

In an aspect of the disclosure, the first processor is the second processor.

In other aspects of the disclosure, the on-board charging system may not have a processor that may be set in an active fleet controller mode where the processor is an active fleet controller and an inactive fleet controller mode, where, when set in the inactive fleet controller mode. In this aspect of the disclosure, the on-board charging system may have a processor similar to the second processor. For example, the processor may be configured to transmit a real-time DC voltage of an energy storage system of the vehicle, via the communication interface, receive a value proportional to a calculated reactive AC current via the communication interface from a vehicle having a processor set to an active fleet controller mode or from a dedicated external fleet controller, cause a reactive AC current based on the received value to be supplied by conversion circuitry in the on-board charging system such that it flows through each inductor, the switchgear and transformer, reducing the peak V_LL; after the reactive AC current is injected, the processor or may regulate a system DC bus voltage to substantially match the real-time voltage of the energy storage system and control one or more switches associated with the energy storage system to close when the peak V_LL is less than the real-time voltage of the energy storage system and the system DC bus voltage substantially matches the real-time voltage of the energy storage system. The energy storage system may be charged after the control of the one or more switches.

In an aspect of the disclosure, this processor may be configured to transmit the real-time voltage of the energy storage system while the energy storage system is charging and receive an updated value proportional to the calculated reactive AC current.

BRIEF DESCRIPTION OF THE DRAWINGS

FIG. 2A illustrates a configuration where one of the vehicles is an active fleet controller with an lead charger controller and the other vehicles are followers with a follower charger controller; FIG. 2B illustrates a configuration where the electric utility distribution has an external fleet controller which is active and all of the vehicles are followers (follower charger controller); and FIG. 2C illustrates a configuration where an external controller is remote from the vehicles and electric utility distribution, and the depot has the external fleet controller and all of the vehicles are followers (follower charger controller);

DETAILED DESCRIPTION

The systems, apparatus, methods (and computer-readable instructions) describe herein are directed to coordinating, managing and controlling the charging of energy storage systems (ESS) in respective vehicles within a charging group(s) connected to an external AC power source(s).

A vehicle (generically referred with number "1") may be a personal vehicle, such as a scooter, car, motorcycle and truck or a commercial vehicle such as a truck or bus, a maritime vehicle such as a boat or submarine or a military vehicle such as a tank, self-propelled artillery, or troop transport. The vehicle may also be an airplane, a helicopter, UAV and other powered air vehicles. The vehicle may be an electric vehicle (such as a battery electric vehicle "BEV"), a hybrid electric vehicle ("HEV"), or any similar electric vehicle configuration with an ESS.

The term charging group (generically referred with number "2") refers to vehicles that are connected to the same AC power source such as a transformer via switchgear (where cables are connected to charging ports at the switchgear). Preferably, the vehicles within the charging group have a similar nominal voltage for the respective ESS. The nominal voltage for the vehicle will vary based on the size and function of a vehicle. For example, for a bus, the nominal voltage for the vehicle may be around 650 Vdc. In some examples, for on-board charger provided with US standard 277/480Vac input voltage the nominal voltage of the ESS may be below 1000Vdc and above 500Vdc. Any ESS nominal voltage is possible by varying the transformer output AC voltage; however, it is unlikely for electric vehicle ESS voltage to exceed 1000Vdc. If the ESS voltage is below 500Vdc, then a one-phase converter can be used such as the US standard 120/240Vac grid input voltage.

The term depot 100 used here refers to a location where vehicles may be charged. The depot 100 may be inside a building and have other infrastructure including electrical and electromagnetic equipment or be a parking lot. The depot may be co-located in a place of storage of the vehicles or may be a dedicated charging location for the vehicles.

Figure 1A:
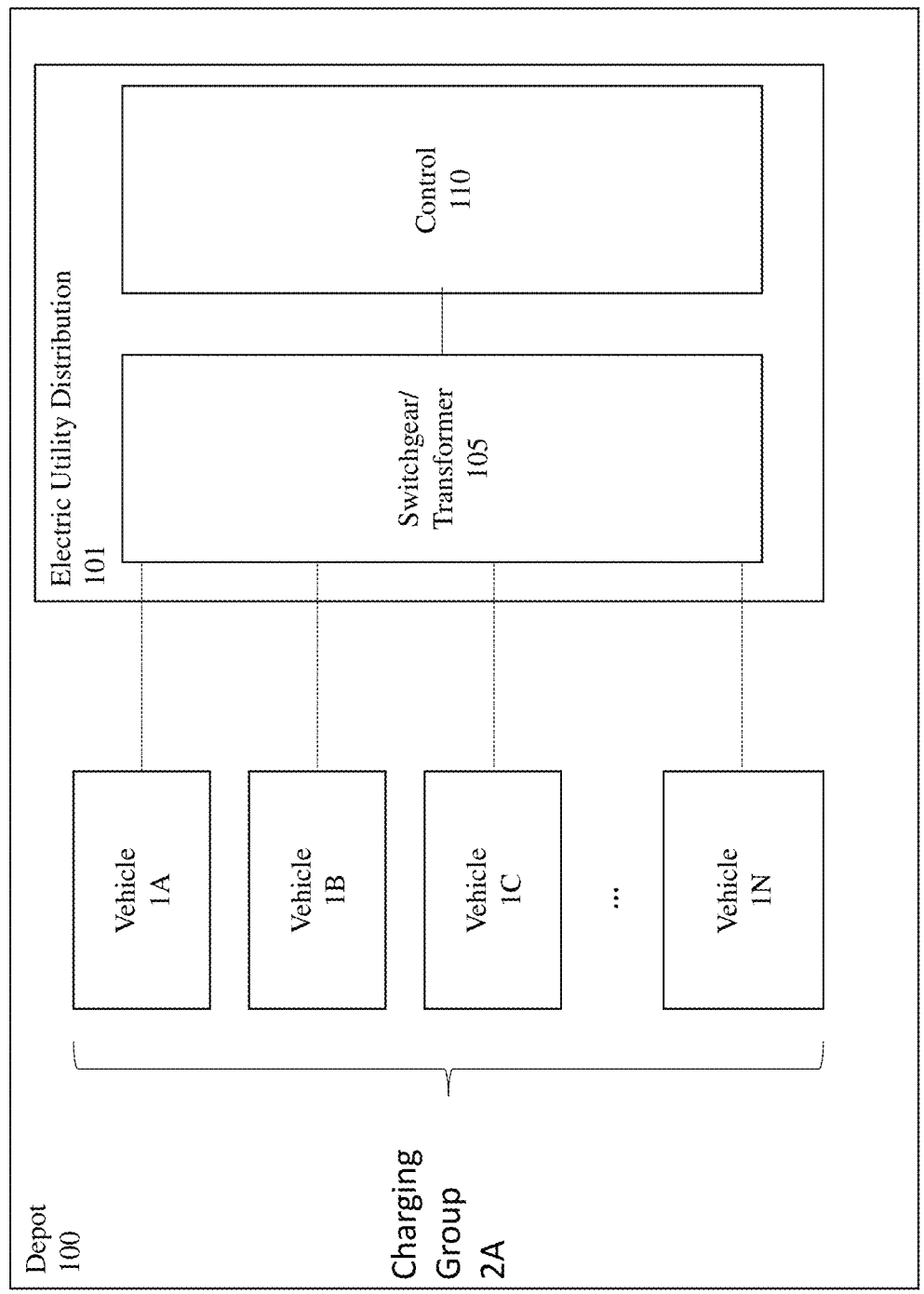
FIG. 1A is a diagram of an example charging system in accordance with aspects of the disclosure where the depot has a single switchgear/transformer station.
Figure 1B:
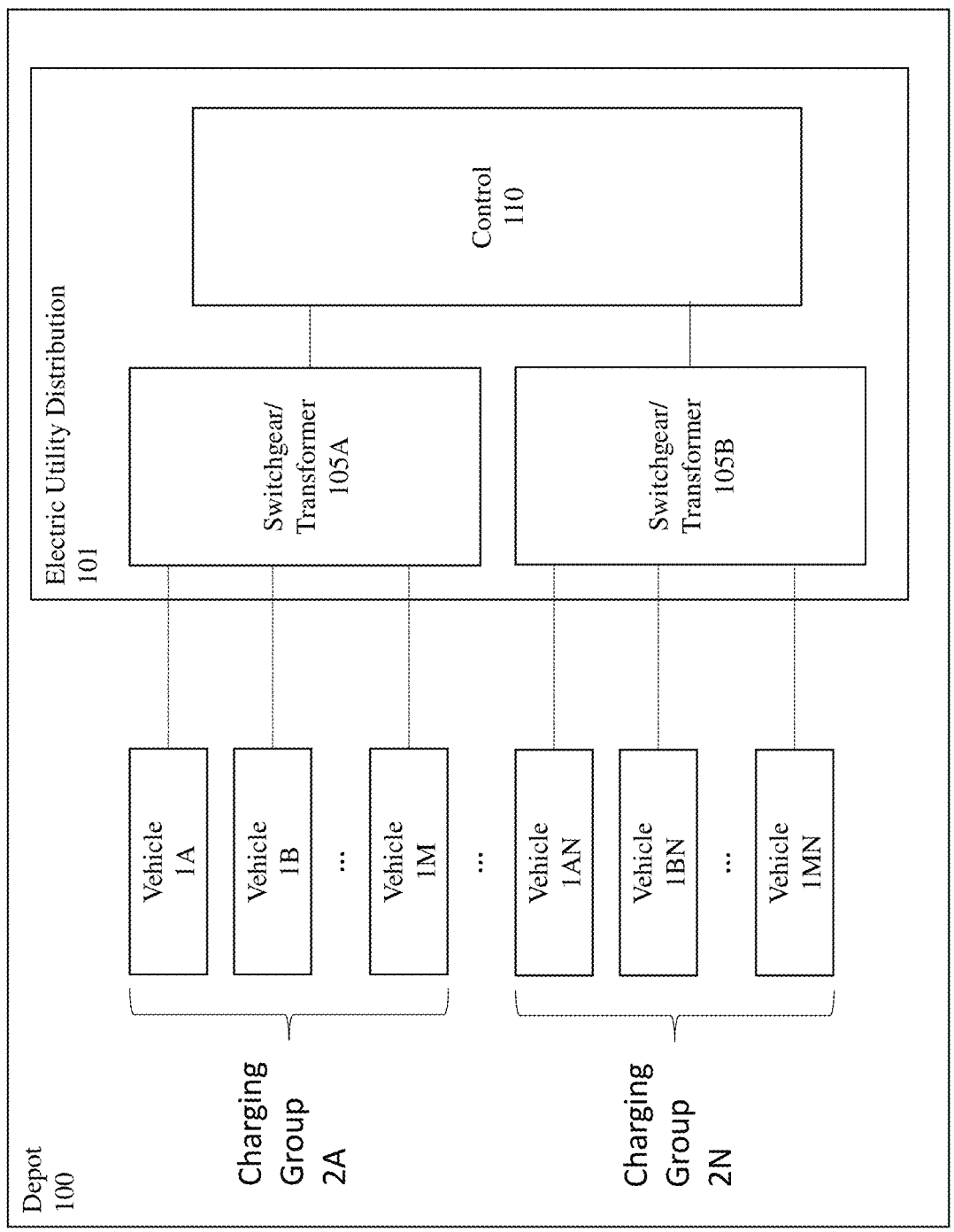
FIG. 1B is a diagram of an example charging system in accordance with aspects of the disclosure where the depot has multiple switchgear/transformer stations.
Figure 3:
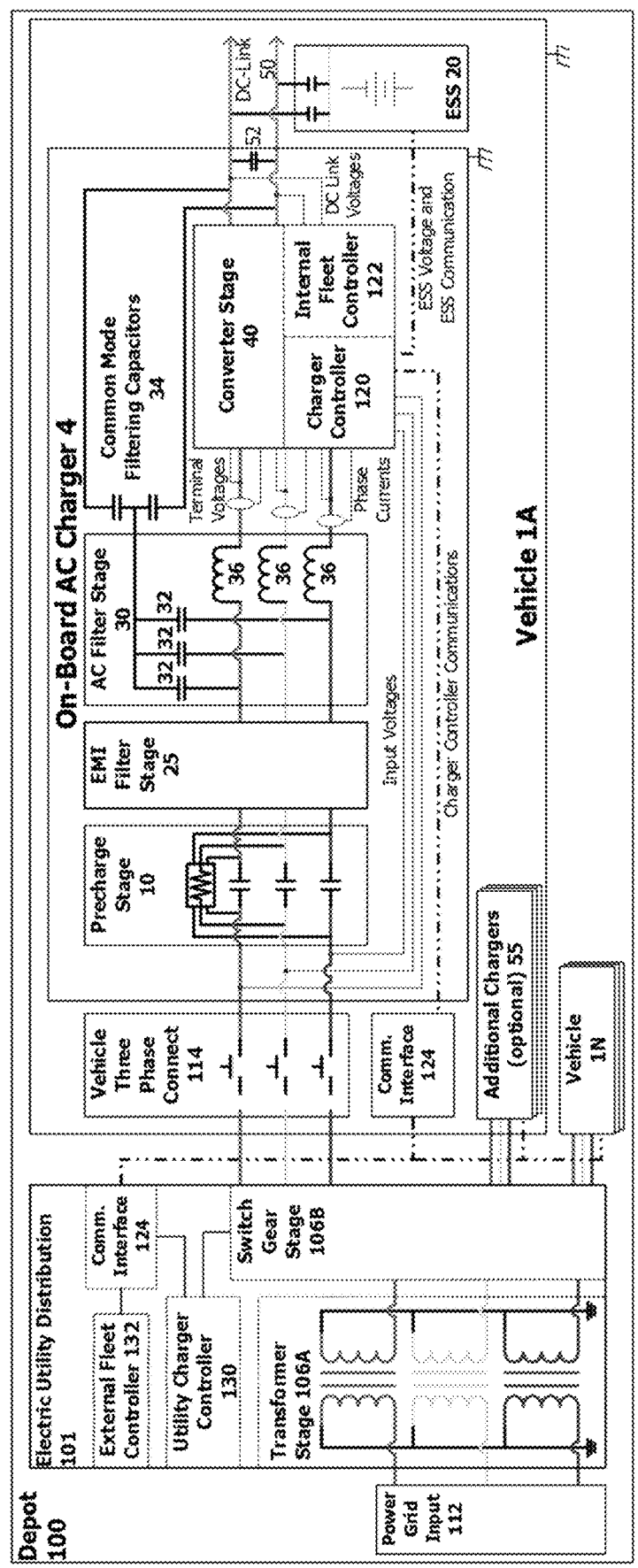
FIG. 3 is a diagram of an on-board AC charging system for vehicles connected to an external AC power source via the switchgear stage in accordance with aspects of the disclosure.

The depot 100 may be connected to the power grid input 112 and include the electric utility distribution 101 (utility grid). The utility grid provides the seed AC input power source required to charge vehicles. In other aspects, the depot 100 may also exclude the electric utility distribution 101 and receive the AC power from a remote transformer stage or from a remote switchgear stage. In an aspect of the disclosure, the power source may be a transformer (also referred to herein as a transformer stage 106A within the depot 100 such as shown in FIG. 3). Vehicles in the charging group 2 may be connected to the transformer stage 106A (also referred to herein a transformer for short) via a switchgear stage 106B (also referred to herein as switchgear for short). The depot 100 may have one transformer stage 106A and switchgear 106B (collectively switchgear/transformer 105) as shown in FIG. 1A or multiple sets of transformer stages and switchgear stages (such as switchgear/transformer 105A and 105B) as shown in FIG. 1B.

The size/capacity of the transformer stage 106A may be based on the type of vehicles, size of vehicles and target size for the transformer group 2. Since different vehicles may have different sizes, the practical capacity of the depot 100 may be based on the space available at the location. For example, if the vehicles are large airplanes, less vehicles may be included in the charger group based on the size of the depot and power needed. Moreover, given the size of the vehicles, the cables in or attached to the switchgear would be impractically long if dozens of airplanes are connected to the same transformer stage 106A. Moreover, the power needed to charge an ESS in a large airplane would be higher than the power needed to charge an ESS in a commercial bus. In an aspect of the disclosure, the seed power (Utility-side input) to the transformer stage 106A is a higher voltage than the output of the transformer stage 106A (vehicle-side).

An example of a three-phase wye-wye transformer stage 106A is shown in FIG. 3. The transformer is not limited to three-phase and may be a single phase. In other aspects, the transformer may be six-phases. The transformer is not limited to wye-wye connection. In other aspects, the transformer primary (HV) and secondary (LV) connection may be any combination or variation of transformer connection methods. The transformer is not limited to a specific primary and secondary voltage. The transformer secondary connection may have a V_LL output of about 277/480Vac. In some aspects of the disclosure, the size of the charging group 2 may be 10 or more.

In some aspects of the disclosure, different transformer stages 106A may be used for the different sets of switchgear/transformer 105A or 105B. For example, a first charging group 2A may be commercial buses (Vehicle 1A-1M, where M refers to the Mth vehicle in the vehicle group) whereas another charging group 2N (where N refers to the nth charging group in the depot 100 may be comprised of buses, boats or airplanes (1AN-1MN, where MN refers to the Mth vehicle in the Nth charging group). Different number of vehicles may be in the different charging groups.

The switchgear 106B may comprise a plurality of ports for the vehicles to connected to via cables. The cables may be integral with the ports or capable of being connected or disconnected; one port/cable for each vehicle in the charging group. The switchgear 106B may also comprise safety equipment such as switches, circuit breakers, contactors, isolators, fuses, and relays. The switchgear 106B may also having voltage and current sensors.

The specific vehicles 1 in a charging group 2 are dynamic and change as needed for charging. Since each vehicle ESS may start charging at different state-of-charge (ESS voltage), the charging time may be different. One vehicle may finish charging, disconnect from the switchgear 106B while other vehicles are still connected and charging. A new vehicle may take the spot of the disconnected vehicle and subsequently charge.

In accordance with aspects of the disclosure, a fleet controller (either internal or external) in conjunction with charger controllers and electric utility distribution controller (utility controller 130) will coordinate the charging of the ESS within the vehicles by exchanging controller data such as, but not limited to the real-time voltage of the ESS, sensed voltages at terminals, reactive current etc.

In an aspect of the disclosure, the fleet controller may be incorporated into a controller internal to the vehicle such as the body controller engine control unit (ECU), system control unit (SCU), or integrated into the charger controller itself. The SCU may receive operator commands via the user interfaces, e.g., gas pedal and brake, and generate torque and/or power commands for the converters and generator (coupled to the engine in a case the vehicle is a hybrid electric vehicle). In some aspects, the fleet controller may be incorporated into firmware of a processor within the SCU. For example, the SCU may receive a firmware update to provide the fleet controller.

Figure 2A:
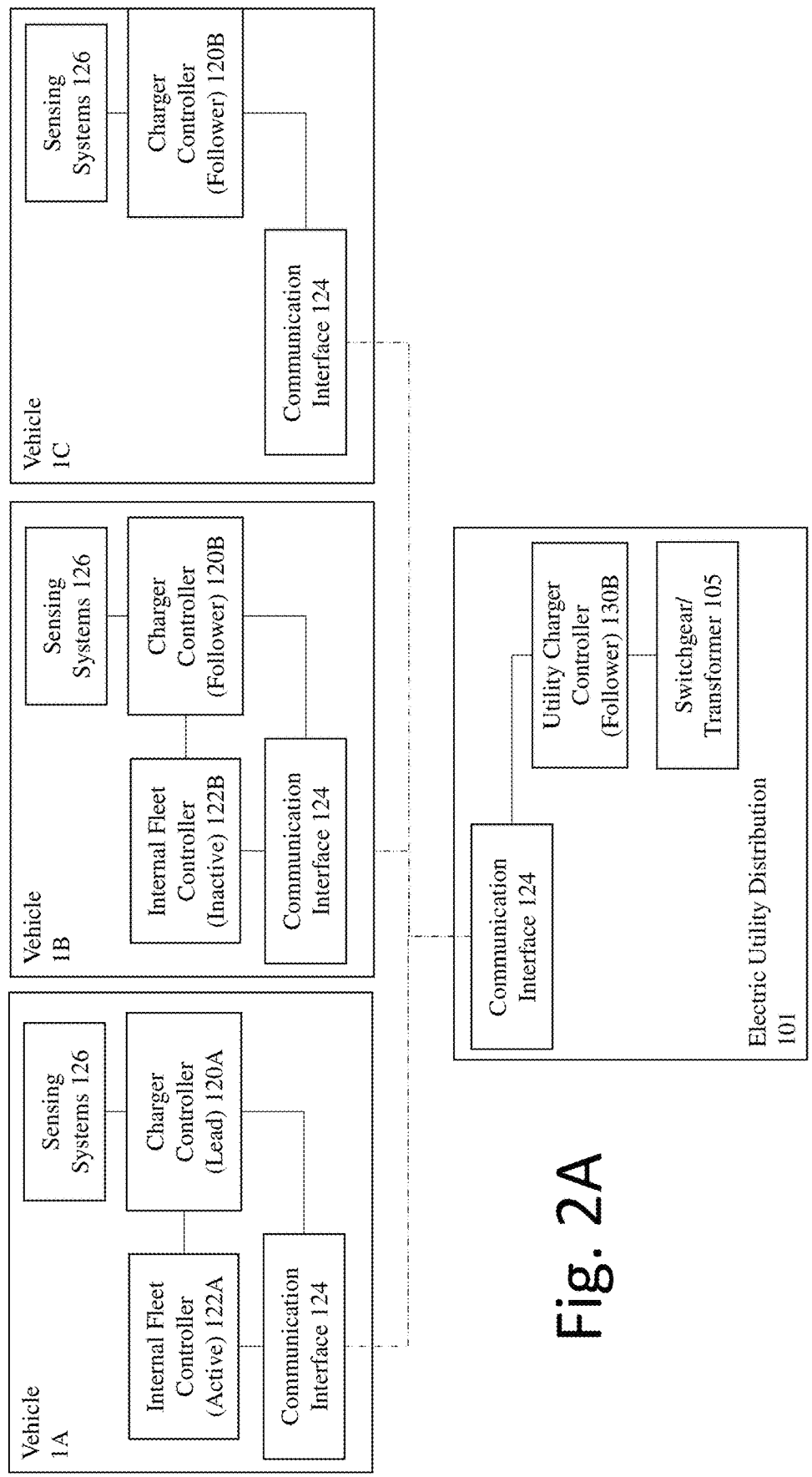
FIGS. 2A-2C are diagrams of different charging system configurations for a vehicle charging group and external systems in accordance with aspects of the disclosure where

Certain vehicles may have an internal fleet controller 122 (such as Vehicle 1A and Vehicle 1B in FIG. 2A), while other vehicles may not have an internal fleet controller (such as Vehicle 1C in FIG. 2A). Additionally, in an aspect of the disclosure, the electric utility distribution 101 may have an external fleet controller 132 (such as electric utility grid 101 in FIG. 2B). Further, in other aspects of the disclosure, the depot 100 may have a remote depot controller 150 that is an external fleet controller 132, which is external to both the vehicles 1 and the electric utility grid 101 (such as remote depot controller 150 in FIG. 2C).

In an aspect of the disclosure, only one fleet controller may be active at a time within a single charging group 2. Accordingly, prior to taking full responsibility as the fleet controller, one fleet controller amongst multiple fleet controller candidates may be selected as the fleet controller for the charging group 2. Any selection criteria for determining the "active" fleet controller may be used. For example, in an aspect of the disclosure, the "active" internal fleet controller 122A may be selected as the vehicle 1 in the charging group 2 that has the lowest state of charge of the ESS in the corresponding vehicle, and there are no external fleet controllers 132. For example, the fleet controller in a vehicle having the lowest current state of charge or voltage may be selected as the active internal fleet controller 122A. This supports continuity in the active fleet controller as the vehicle with the lowest current state of charge may take the longest to charge and thus re-selection of the active fleet controller may be prolonged. In other aspects, the fleet controller associated with the vehicle with the highest state of charge or voltage in the ESS may be selected.

In other aspects of the disclosure, the first vehicle 1 to connect to a switchgear/transformer having an internal fleet controller becomes the internal fleet controller (active) 122A (also referred to herein as active internal fleet controller).

In some aspects, once a fleet controller is selected as the active internal fleet controller, it may remain the active internal fleet controller as long as the vehicle is connected to the switchgear 106B associated with the charging group. In other aspects of the disclosure, the selection of an active fleet controller (internal or external) may be periodically repeated based on the predefined criteria to account for communication from an external fleet controller 132, changes in ESS state of charge (V_ESS), and new vehicles connecting to a vehicle group 2.

Once a fleet controller becomes active such as an internal fleet controller (active) 122A, the remaining internal fleet controller candidate(s) may be set to an inactive state (referred to herein as either internal fleet controller (inactive) or inactive internal fleet controller 122B. FIG. 2A illustrates an example of an internal fleet controller (active) 122A in vehicle 1A whereas the internal fleet controller 122B in vehicle 1B is set to "inactive". In the example, vehicle 1N does not have the capability of being a candidate for the fleet controller. Also in the example, the depot 100 does not have the capability of the fleet controller.

In other aspects of the disclosure, instead of selecting the fleet controller based on the state of charge, if the depot 100 has a fleet controller (external fleet controller 132), the external fleet controller may have a selection priority to be the active external fleet controller 132A. Therefore, even if the vehicles have an internal fleet controller, the same would be set to inactive (inactive internal fleet controller 122B) such as shown in the example in FIG. 2B. The external fleet controller 132 may be incorporated in the electric utility distribution 101 controller such as the utility controller 130.

In other aspects of the disclosure, the system may further have a remote depot controller 150 separate from the electric utility distribution 101 and the vehicles 1 inside the depot 100. The remote depot controller 150 may be used when the depot 100 has multiple switchgears/transformers 105 where the external fleet controller 132 may be capable of controlling each switchgear/transformer for each charging group 2 within the depot 100. In this aspect of the disclosure, the remote depot controller 150 may have an external fleet controller which is always the active fleet controller 132A regardless of whether the electric utility distribution 101 has an inactive external fleet controller (all other external fleet controllers would be set inactive 132B) or any of the vehicles has an internal fleet control 122 (all other internal fleet controllers would be set inactive 122B).

As shown in FIG. 3, the on-board AC charger 4 of the vehicle 1 has a charger controller 120. The charger controller may be set as a "lead" charger controller 120A or a "follower" charger controller 120B [generically referred to herein as charger controller 120 and when set as a lead either lead charger controller or charger controller (lead) and when set as a follower either follower charger controller or charger controller (follower)]. When the vehicle 1 has an active internal fleet controller 122A, the charger controller is set as a lead 120A and when the vehicle either does not have an internal fleet controller 122 or when the internal fleet controller is inactive 122B, the charger controller is set as a follower 120B.

The charger controller 120 and the internal fleet controller 122 communicate with each other. In an aspect of the disclosure, the communication may be via a vehicle network. The vehicle network may be wired or wireless. In another aspect of the disclosure, the internal fleet controller 122 or external fleet controller 132 may be a software functionality integrated within a given controller.

For example, certain components of the vehicle 1 may communicate via the J1939 standard controller area network (CAN). Since the internal fleet controller 122 may be incorporated into the SCU, the internal fleet controller 122 may use the communication interface 124 of the SCU. Alternatively, the internal fleet controller 122 may have a dedicated communication interface 124 to communicate with the charger controller 120. The network is not limited to CAN, but may also be RS serial communication, analog/discrete communication, etc. Additionally, the network may be wireless such as WiFi®, WiFi® direct, WLAN, near field communication or Bluetooth. Thus, the communication interface 124 may be a wireless communication interface or a wired communication interface. In another aspect of the disclosure, the internal fleet controller 122 may be an integrated software function that does not require the communication interface 124 to interact with charger controller 120.

Similarly, the charger controller 120 may comprise a communication interface 124 (wired or wireless). In addition to communicating with each other, the charger controller 120 and internal fleet controller 122 may communicate with other vehicles (controllers therein) and the grid-side (such as the electric utility distribution 101 and the utility controller 130 or a remote depot controller 150). Further, the charger controller 120 and or internal fleet controller 122 may also directly or indirectly communicate with the ESS 20.

Figure 2B:
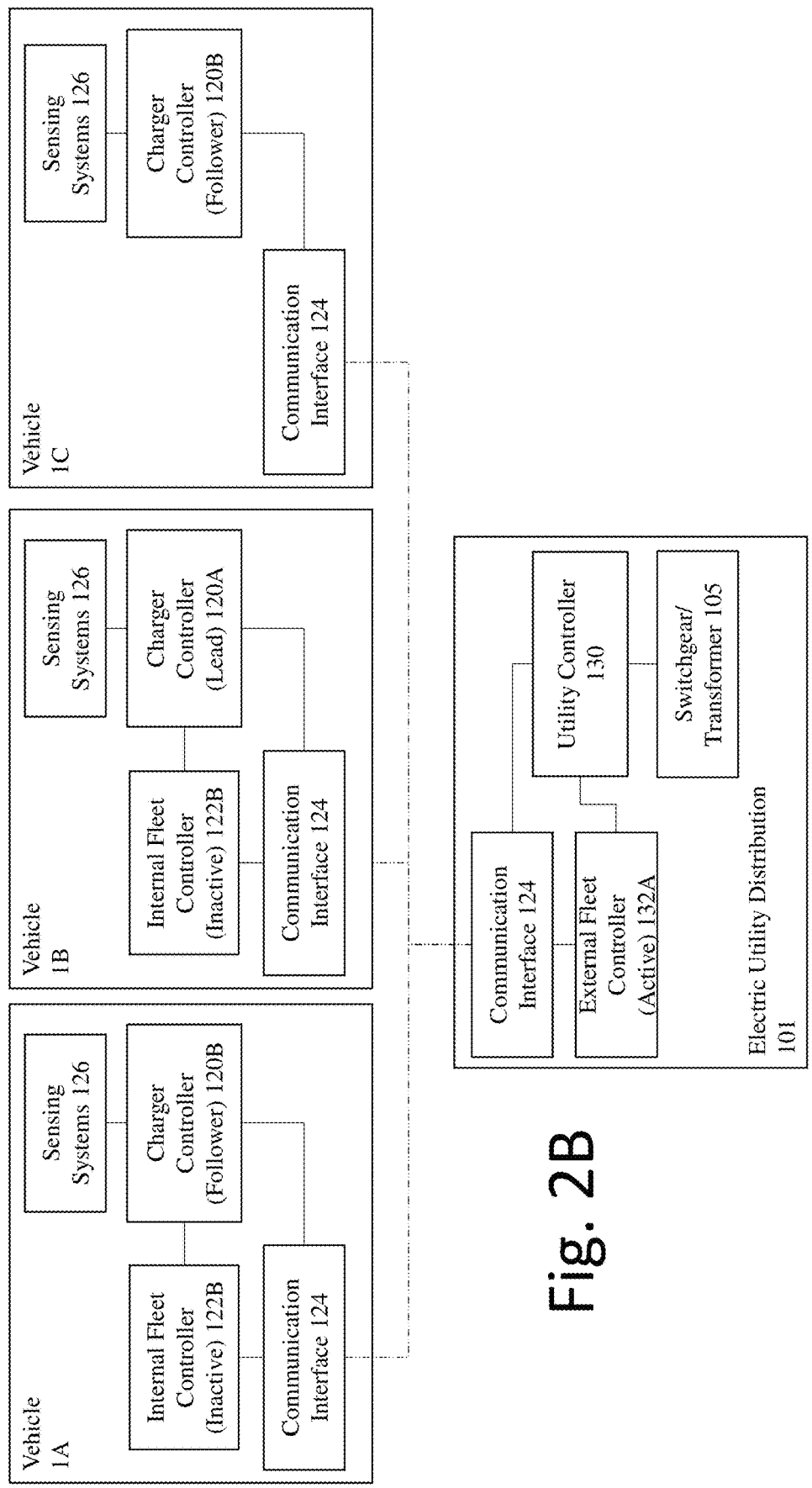
Figure 2C:
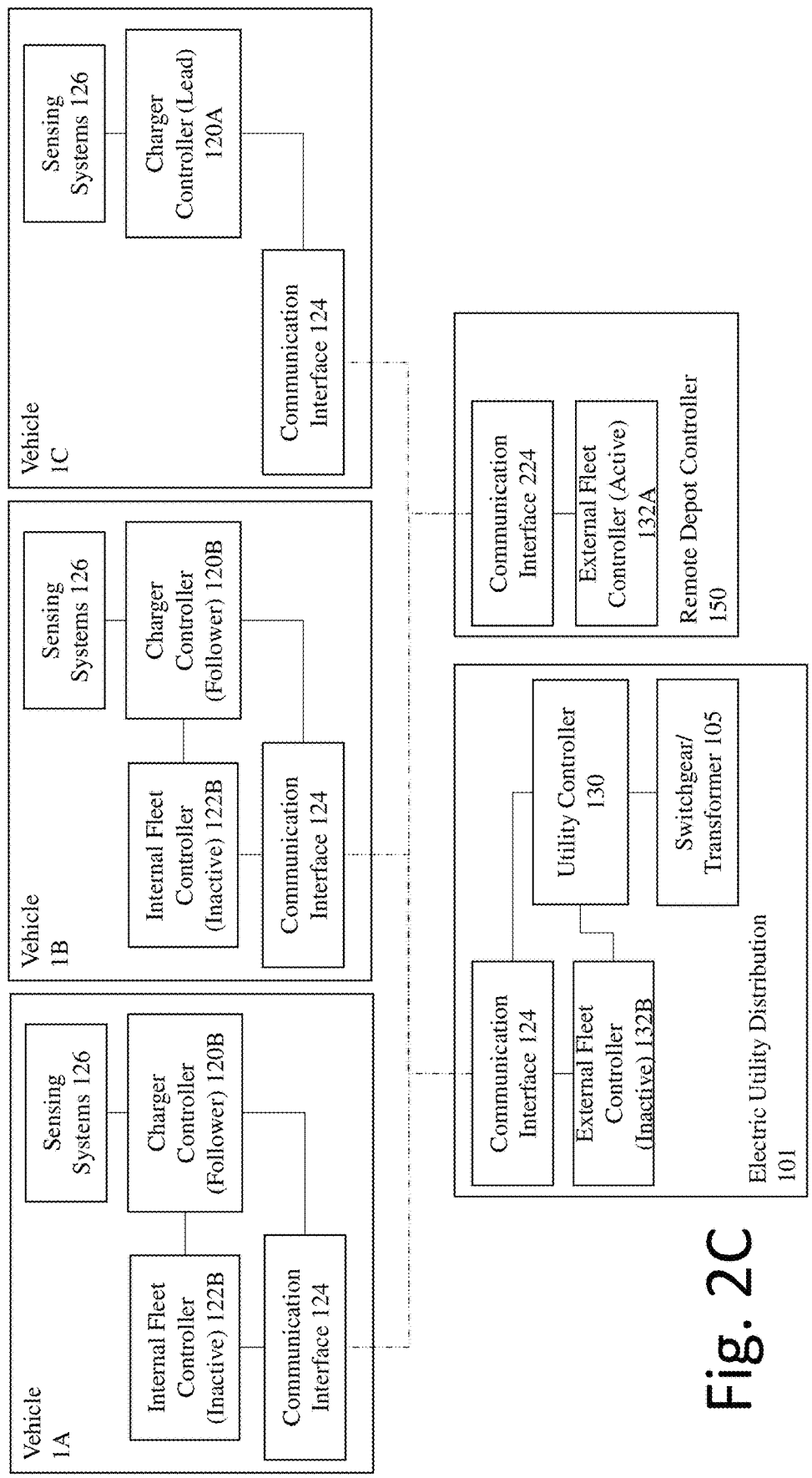

In the examples shown in FIGS. 2A-2C, the charger controller 120 and the internal fleet controller 122 are separate from each other, however, in other aspects of the disclosure, the internal fleet controller 122 may be integrated into the charger controller 120.

Additionally, in the example of the vehicles 1A/1B in FIGS. 2A/2B, the communication interface 124 is depicted separate from both the charger controller 120 and the fleet controller (and the same one used for both), however, the disclosure is not limited to the examples and different communication interfaces may be used.

The communication interface 124 is used to communicate relevant statuses, faults and measurements, including the current state of charge (voltage of the ESS).

In some aspects of the disclosure, the depot 100 has the fleet controller (external fleet controller 132) incorporated in control 110 of the electric utility distribution 101. The fleet controller 132 comprises a processor. The processor may communicate using a vehicle-grid network via a communication interface 124. The communication interface 124 may be similar to described above. For example, the communication interface 124 may be a wireless communication interface. In some aspects of the disclosure, when the depot 100 has more than one switchgear/transformer 105, the depot 100 may have multiple communication interfaces 124, one dedicated communication interface per switchgear/transformer 105.

In some aspects of the disclosure, the remote depot controller 150 (separate from the electric utility distribution 101) has the fleet controller (external fleet controller). In this aspect, the remote depot controller 150 comprises a processor and a communication interface 124. The remote depot controller 150 may communicate directly with the electric utility distribution 101 (indirectly with the vehicles 1) or by-pass the electric utility distribution 101 and communicate directly with the vehicles 1.

FIG. 3 illustrates an on-board AC charger 4 in accordance with aspects of the disclosure. The on-board AC charger 4 is similar to the AC charger described in U.S. Pat. No. 11,052,782, which is incorporated by reference.

In an aspect of the disclosure, the on-board AC charger 4 may be coupled to the switchgear stage 106B (and transformer stage 106A) using a connector 114. The connector 114 may be a connection system with High Voltage Interlock Loop (HVIL). The connector 114 may also have Electromagnetic Interface Shielding (EMI) for noise reduction. The connector 114 includes a ground wire. As shown in FIG. 3, the connector 114 is for three-phases, however as noted above, the number of phases is not limited to three and thus the connector is also not limited to three phase.

The on-board AC charger 4 may comprise a switch(es) with precharge (shown schematically in FIG. 3 and identified as "10"). Each phase line has an AC switch. In some aspects, the AC switch(es) may be a relay (an electrically operated switch). For high power applications, the relay may be a contactor. In other aspects of the disclosure, the switches may be semiconductor based, such as a Solid State Circuit Breaker. In other aspects of the disclosure, a mechanically operated switch may be used.

Figure 4:
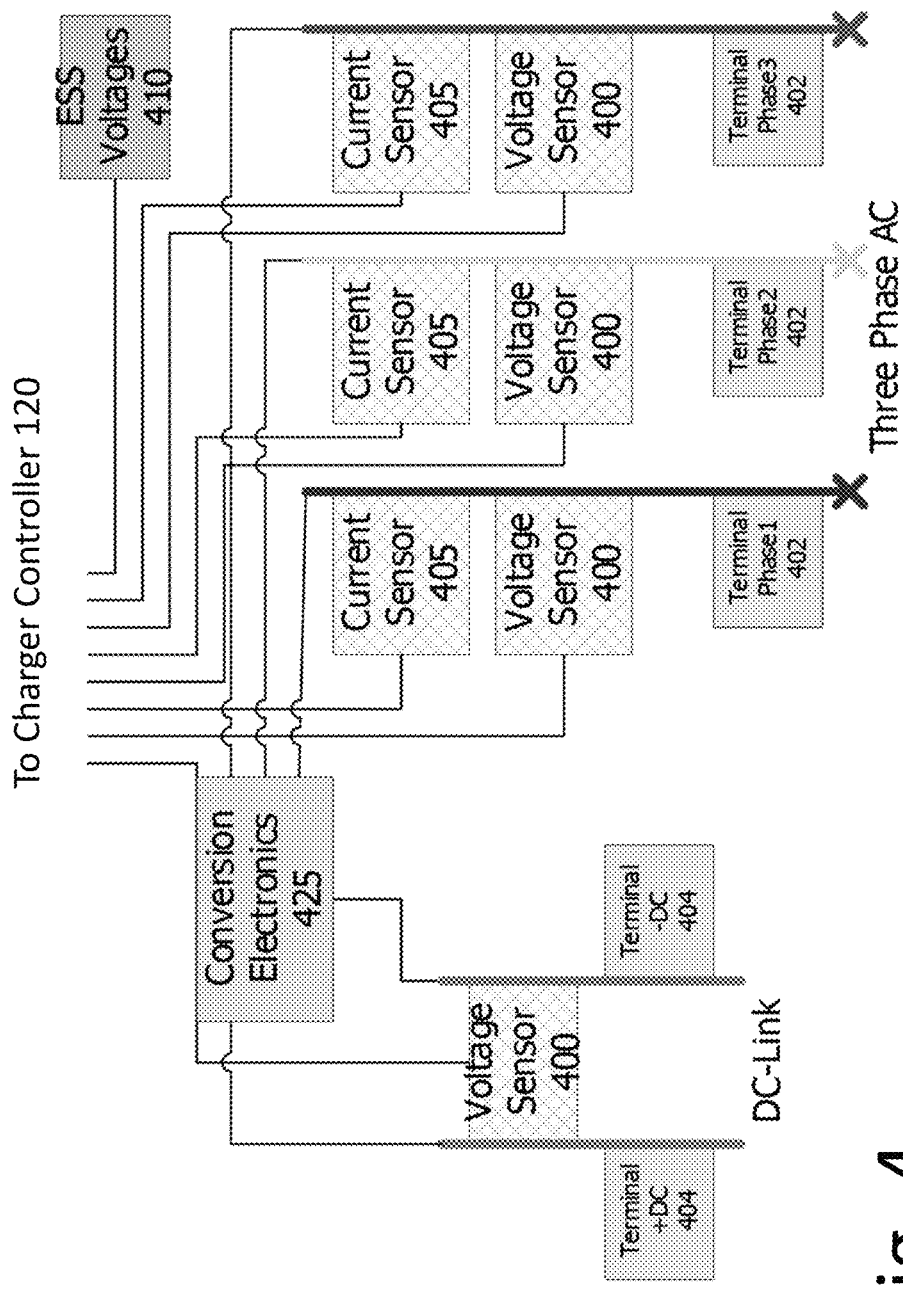
FIG. 4 is a diagram of a converter stage and associated sensors in accordance with aspects of the disclosure.

When the AC switch(es) are closed, the switchgear stage 106B and transformer stage 106A are electrically coupled with the converter stage terminals (shown in FIG. 4 as terminal(s) 402). When the AC switch(es) are opened, the switchgear stage 106B and transformer stage 106A is electrically isolated by the terminals 402. In FIG. 3, three switch(es) are shown (one for each phase), however, in other aspects of the disclosure, a single switching device that may have multiple connection points may be used for all phases.

In an aspect of the disclosure, a charger controller 120 (whether lead or follower) controls the switch(es).

In an aspect of the disclosure, the on-board AC charger 4 may have inrush current protection (precharge). As shown in FIG. 3, resistance circuit is placed in parallel with the switch(es). In some aspects of the disclosure, the resistance circuit comprises a resistor in series with a switch. The resistor may have a fixed value. The charger controller 120 may control the switch to close upon detection of the switchgear stage 106B (connection). Once the precharge current has effectively zeroed through the system, the charger controller 120 may open the switch (in series with the resistor). In other aspects, the resistance may be provided by an NTC thermistor. The NTC thermistor may also be placed in series with the switch.

The on-board AC charger 4 may also comprise an EMI Filter Stage 25 and an AC Filter Stage 30. The EMI Filter Stage 25 is also for reducing noise. The circuitry used for an EMI Filter Stage 25 is well known and a commercial off the shelf EMI filter may be used.

The AC Filter Stage 30 may comprise a LC circuit for each phase (capacitor 32 and inductor 36). As shown in FIG. 3, the AC Filter Stage 30 is configured in a common mode. The stage 30 also comprises common mode filtering capacitors 34. However, other configurations for the AC filter stage 30 are possible and the configuration of the stage 30 is not limited to the depicted configuration.

The on-board AC charger 4 may also comprise a converter stage 40 and sensing circuitry (sensing systems 126). A schematic diagram of the converter stage 40 with sensing circuitry is shown in FIG. 4. The vehicle 1 (e.g., vehicle 1A) may optionally have additional chargers 55.

The converter stage 40 may be electrically connected to the ESS 20 via the DC link 50. As described above, the charger controller 120 may communicate with the ESS and obtain the DC link voltage (V_ESS). The ESS 20 may be connected to the DC link 50 via contactors or other protection circuitry. The contactors are used to selectively electrically connect/isolate the ESS 20 from or to the DC link 50. In some aspects, the charger controller 120 may control the DC contactors. Capacitance 52 is connected to the DC link 50. ESS 20 may receive power via the DC link or provide power to the same.

The ESS 20 may comprise lithium-ion batteries. The ESS 20 may also alternatively include ultra-capacitors, lead-acid batteries, and other energy storage system methods. The ultra-capacitor may include an electric double-layer capacitor (EDLC), also known as a supercapacitor, a supercondenser, or an electrochemical double layer capacitor, which has an electrochemical capacitor with relatively high energy density.

Fleet controller communications are shown in FIG. 3 with dotted and dashed lines (between the communication interface 124 and the charger controller 122).

Voltage and currents may be sensed. FIG. 4 illustrates an example of the converter stage 40 with sensors in accordance with aspects of the disclosure. The converter stage 40 may comprise a plurality of terminals 402, one per phase. In the example in FIG. 4, there are three phases: Phase 1, Phase 2 and Phase 3 (representing the three phase AC). These may also be referred to as Input terminals (receiving power from the external power source). In aspects of the disclosure, both the voltage and current at the terminals 402 may be sensed. For example, for each phase, a voltage sensor 400 and a current sensor 405 may be used. In other aspects, the current sensor 405 may be omitted. Additionally, there may only be two current sensors on the AC link (on two of the three phases).

Similarly, there may be voltage sensors 400 for the DC link (terminals+−404). The DC link may also have current sensors (not shown). As depicted, the voltage sensors 400 and current sensors 405 are located within the converter stage 40, however, in other aspects of the disclosure, the sensors 400/405 may be external to the converter stage 40. In an aspect of the disclosure, the current sensors 405 may be hall effect sensors. In other aspects of the disclosure, a current sensing shunt resistor circuit may be used.

The sensors 400, 405 are connected to the charger controller 120. In an aspect of the disclosure, the received sensed values (voltage/current) may be transmitted to the fleet controller (internal or external). In some aspects of the disclosure, prior to transmission, the charger controller 120 calculates certain values from the sensed values and transmits the calculated values to the fleet controller (internal 122 or external 132). For example, the charger controller 120 may use the sensed AC voltages to calculate a peak-line-line voltage (V_LL).

The charger controller 120 may also receive the current ESS voltage or SOC 410 from the ESS 20.

The converter stage 40 may also comprise conversion electronics 425 for converting AC into DC and vice versa under the control of the charger controller 120 and inject a reactive current for field weakening in response to an instruction from either an internal or external active fleet controller. The conversion electronics 425 may comprise switches such as MOSFETS for each phase. The switches are an example of "conversion circuitry". Conversion circuitry and conversion electronics 425 are used interchangeably herein. The charger controller 120 may function as a gate driver for the switches.

When a vehicle 1 or vehicles connected to a particular switchgear stage 106B, the charging group is defined (or updated), and one fleet controller (either internal or external) is selected for being active (or maintained). When a depot 100 has multiple switchgear/transformers 105, either the vehicle 1 and/or the depot 100 needs to know which switchgear/transformer 105 the vehicle 1 is connected to. In an aspect of the disclosure, each transformer (switchgear/transformers 105) may be associated with a different detection resistor which may be sensed by a charger controller 120 when the vehicle 1 is first connected to the switchgear stage 106B. All subsequent communication may include the detection value such that the other vehicles (e.g., vehicle 1B-1M or vehicle 1Z-1NN) may recognize other vehicles connected to the same switchgear/transformer 105. In other aspects of the disclosure, the switchgear/transformer 105 may include a communication interface that broadcasts an identifier associated with the switchgear/transformer 105. This communication interface may broadcast over a short predetermined distance (e.g., 10 ft) so as to prevent communication interference between nearby vehicles and hubs, reduce power consumption for transmission and/or avoid vehicles that do not intend to be charged or connected to the switchgear/transformer 105 to receive the message. All subsequent communication may include the broadcast identifier. In other aspects of the disclosure, as noted above, each switchgear/transformer 105 might be associated with a different communication interface, where the interface has a unique identifier (or in a case where the interface is wireless (a different SSID). Vehicles connected to the same transformer would communicate using the SSID or interface associated with the switchgear/transformer 105.

Figure 5A:
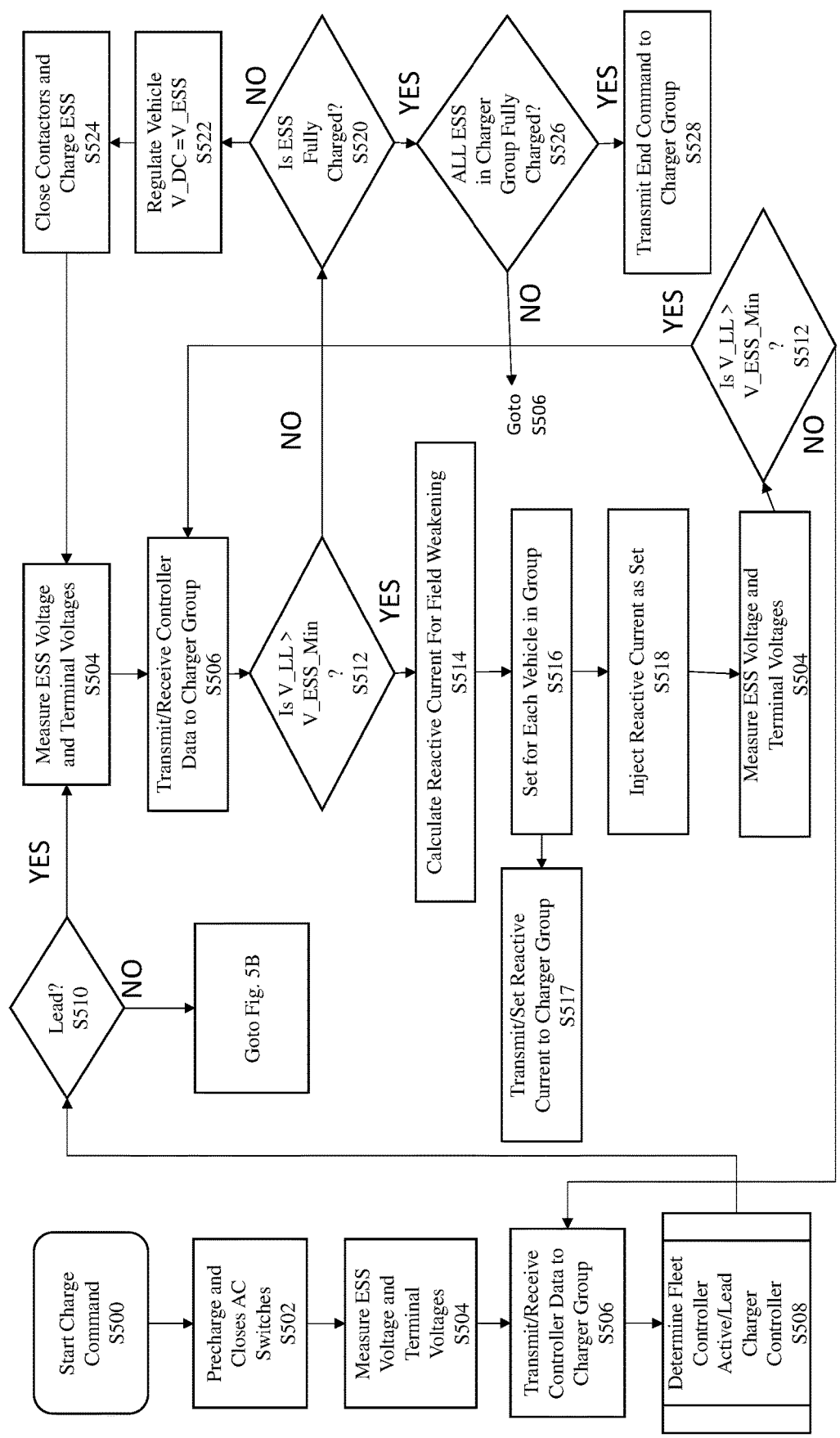
FIGS. 5A and 5B are flow diagrams for charging the energy storage devices within a charging group using field weakening in accordance with aspects of the disclosure.
Figure 5B:
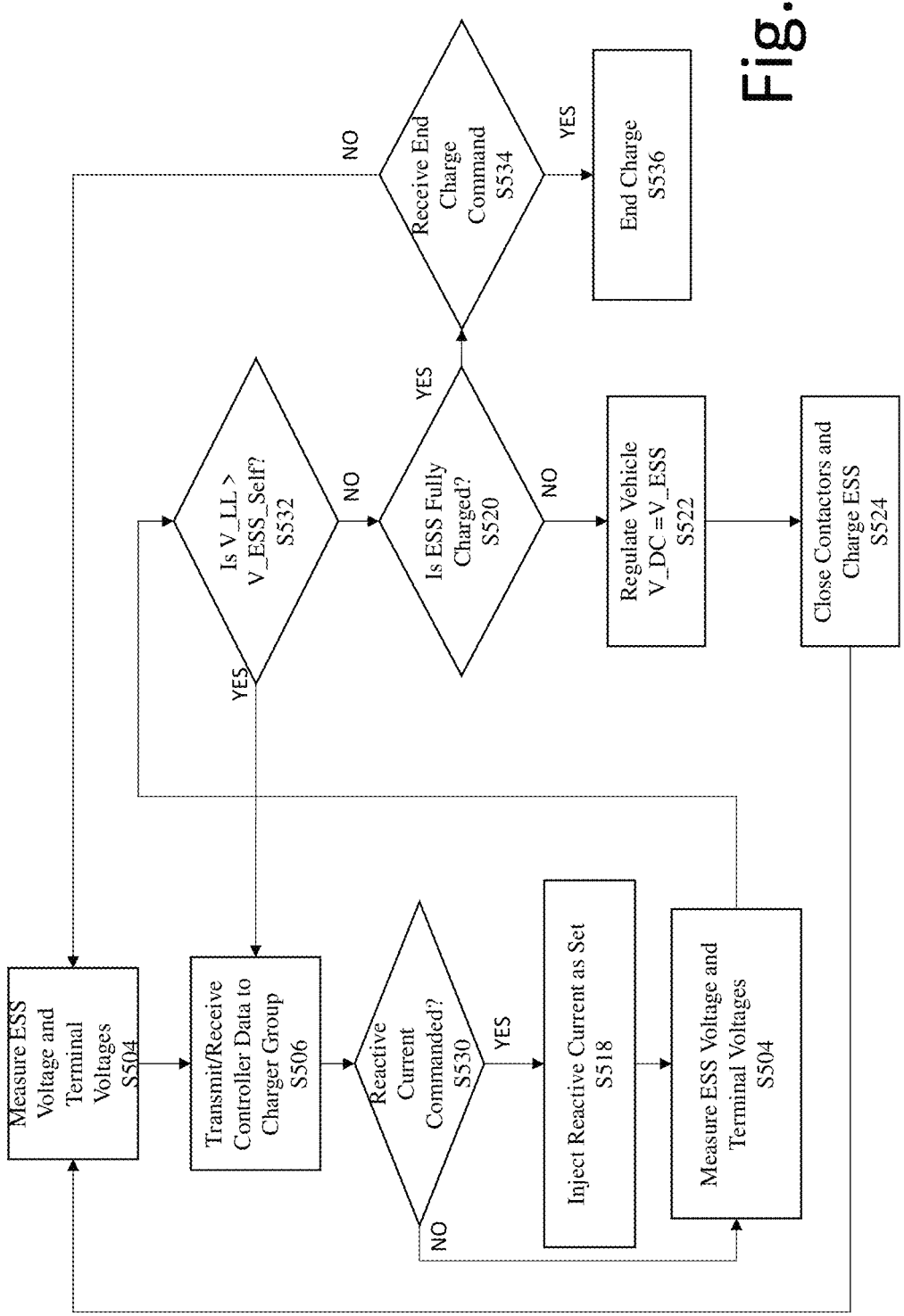

FIGS. 5A and 5B illustrate a method of charging ESS's 20 in a charging group 2 in accordance with aspects of the disclosure.

At S500, a charge command is received by the charger controller 120. In an aspect of the disclosure, the charge command may be received from the ESS 20. In this aspect of the disclosure, the ESS 20 may indicate to the charger controller 120 that the cells need to be charged. In another aspect of the disclosure, the SCU may issue a command to the charger controller 120 to charge the ESS 20. In other aspects of the disclosure, the charger controller 120 may detect a connection with the switchgear/transformer 105 and initiate a charging session.

In other aspects of the disclosure, the charger controller 120 may directly sense the voltage of the ESS 20. When the sensed voltage is below a preset threshold, the charger controller 120 may initiate the charging session. When a charging session is initiated, the charger controller 120 controls the DC contactors to open (if closed) to isolate the ESS 20 from the DC Link 50. This may be done using a low voltage control signal.

At S502, the charger controller 120 causes precharging to occur followed by the closing of the AC switch(es) (and opening the switch in the resistance circuit). When a resistor is used for the precharging (inrush protection), the charger controller 120 closes the AC switch(es) when a predetermined time has elapsed or once the precharge current has effectively zeroed in the system. The charger controller 120 issues a control signal to the switch(es). In an aspect of the disclosure, the control signal is a low voltage control signal which actuates the switch(es). In other aspects of the disclosure, where a resistor in series with a switch is used as the precharging, the charger controller 120 will also control the switch (in series with the resistor) to close when the charge command is received and open after a predetermined time or current flow. Subsequently, the charger controller 120 will control the switch(es) as described above.

At this point in time, the ESS 20 is electrically isolated from the DC Link 50 as described above at S500, e.g., DC contactors are open.

In parallel, the vehicles in the charging group may be identified as described above.

At S504, the voltages at terminal 402 may be sensed via the voltage sensors 400 e.g., localized voltage. Also, the voltage of the ESS 20 is determined. In an aspect of the disclosure, the ESS 20 may provide the charger controller 120 with the voltage via the vehicle network and the communication interface 124. In other aspects, the charger controller 120 causes the voltage to the measured.

At S506, the charger controller 120 sends the controller data including V_ESS and voltages at the terminals 402 to all of the vehicles in the charging group 2 (vehicle to vehicle communication) via the communication interface 124. In an aspect of the disclosure, the charger controller 120 also transmits the data to the depot 100 (vehicle to grid communication) via the communication interface 124 (such as to a utility controller 130). At this point in time (the charger controller 120 of a newly connected vehicle is not yet set to lead or follower). Since vehicles may already be connected to the switchgear/transformer 105, there may already be a fleet controller which is active such as an active internal fleet controller 122A for the charging group 2.

Also at S506, the charger controller 120 receives the controller data from other vehicles within a charging group 2. In an aspect of the disclosure, the controller data transmitted in S506 may also include an indication of whether the vehicle has an internal fleet controller 122 (e.g., can be a candidate for a fleet controller).

At S508, using the controller data from S506, the active internal fleet controller 122A is selected and by association the lead charger controller 120A based on one or more selection criteria as described above. If at the time the new vehicle joins a charging group 2, there is already a fleet controller which is active and a lead charger controller 120A, the same may continue at the active fleet controller and the lead charger controller 120A. However, in other aspects of the disclosure, the selection may be repeated to account for the current V_ESS of all of the vehicles in the charging group.

In the method depicted in FIGS. 5A/5B, it is assumed that either the electric utility distribution 101 does not have a fleet controller or that there is no priority given to an external fleet controller.

Also since only vehicles having the functionality and structure for the internal fleet controller 122 may be candidates, certain vehicles may omit S508. Accordingly, in an aspect of the disclosure, the fleet controller 122 may execute S508. The data transmitted/received in S506 may be transferred to the fleet controller (intra-vehicle communication).

At S508, the selected candidate activates the internal fleet controller 122A and the set the associated charger controller as lead 120A. Once activated, the active internal fleet controller 122A may issue a notification identifying the active internal fleet controller and lead charger controller 120A via the communication interface 124.

At S510, each vehicle with the charging group 2 may determine whether the controllers 120/122 are active/lead or inactive/follower or just follower (where no fleet controller exists in the vehicle). This determination may be based on the setting a notification in S508.

When the controllers 120/122 are in inactive/follower or just follower (NO at S510), the process moves to the features in FIG. 5B. On the other hand, when set as the internal fleet controller (active) 122A and lead charger controller 120A (YES at S510), the controllers 120A/122A determine whether field weakening is needed, how much and which vehicles execute the field weakening.

The measurement/detection of voltages and transmission/reception of the controller data is repeatedly performed at each vehicle in the charging group 2 such that the determination of field weakening is based on the latest data. Accordingly, S504/S506 are repeatedly executed at several different timings within the process.

At S512, the internal fleet controller (active) 122A determines whether field weakening is needed. Initially, the internal fleet controller (active) 122A determines the minimum current ESS voltage of any ESS of vehicles within the vehicle group 2 (by comparing all received ESS voltage and its own) (V_ESS_Min). The internal fleet controller (active) 122A also calculates the peak-line-line voltage (V_LL) associated with the switchgear/transformer 105 based on either the received voltage measured at the terminals 402 or its own. Since each vehicle is connected to the same switchgear/transformer 105, V_LL for each vehicle at terminals 402 should be approximately the same.

In other aspects, when the individual vehicle charger controllers 120 calculate V_LL, the internal fleet controller (active) 122A does not need to re-calculate.

V_LL may be directly calculated from the detected phase voltages. The inductance of the transformer stage 106A is assumed to be substantially larger than the in-vehicle inductance in the charger 4.

There may be a difference in the V_LL calculated by each vehicle within the vehicle group. This may be because there may be variations in each vehicle converter stage, sensor accuracy and resistance variations. Therefore, if the difference in V_LL is small, such as less than a threshold, a fault is not declared. However, if there is a significant difference, there is a system fault declared. In an aspect of the disclosure, the active fleet controller declares the fault communicates with the utility controller 130 which causes the switchgear stage 106B to disconnect a faulty charger (vehicle associated with the large difference). In other aspects, the vehicle 1 which has the large difference (greater than the threshold) causes itself to disconnect.

The internal fleet controller (active) 122A compares the V_LL with V_ESS_Min. When the V_LL is greater than or equal to V_ESS_Min, the internal fleet controller (active) 122A may determine that field weakening is needed ("YES" at S512). On the other hand, when the peak V_LL is less than V_ESS_Min, field weakening is not needed ("NO" at S512) and the process moves to S520.

In other aspects of the disclosure, a voltage margin VM may also be used. The voltage margin may account for deadtime, controls, switching drop, etc. In this case, when the V_LL is greater than V_ESS_Min minus VM, the internal fleet controller (active) 122A determines that field weakened is needed.

At S514, the internal fleet controller (active) 122A determines the amount of field weakening. Field weakening is achieved by injecting a reactive current Id such that it flows through each inductor 36 is injected into the switchgear/transformer 105. This reduces the V_LL at the terminals 402. In an aspect of the disclosure, the reactive current Id needed may be proportional to the difference in the V_LL and V_ESS_Min. In some aspects of the disclosure, the internal fleet controller (active) 122A may have prestored (during a calibration) a look-up table having differences in V_LL/V_ESS_Min and the total required Id. Thus, based on the difference, the internal fleet controller (active) 122A selected the amount of total reactive current needed from the LUT.

In other aspects, the total reactive current Id needed may be iteratively determined using a proportional integral (PI) controller where the PI controller is incorporated in the internal fleet controller (active) 122A.

At S516, internal fleet controller (active) 122A, sets the reactive current Id per vehicle in the vehicle group 2 (also referred to herein ad Id_cmd). In an aspect of the disclosure, the reactive current Id per vehicle may be the same such that it is determined by dividing the total reactive current Id determined at S514 by the number of vehicles in the charging group 2. This divided total reactive current is a value proportional to the calculated reactive current (AC current). In other aspects, the value proportional to the calculated reactive current (Total) may be different for each vehicle and may be from 0 to 100% of the total calculated reactive current. For example, the current voltage or SOC of each ESS may be considered when the internal fleet controller (active) 122A determines the reactive current Id per vehicle. In other aspects, only one vehicle may inject the total reactive current. For example, the vehicle associated with the internal fleet controller (active) 122A may be set as the only vehicle.

Once the reactive current Id per vehicle is determined, at S517 the internal fleet controller (active) 122A transmits the set amount of reactive current Id to each vehicle within the charging group 2. In some aspects, where the set amount is the same, it may be a broadcast. However, in other aspects, where the set amount is different, the command may be a unicast to a dedicated vehicle. The set amount is transferred via the communication interface 124 (from the internal fleet controller (active) 122A to the charger controller (follower) 120B). Additionally, internal fleet controller (active) 122A may send an in-vehicle communication to the associated charger controller (lead) 120A to inject the set reactive current Id (determined for the lead).

Figure 7:
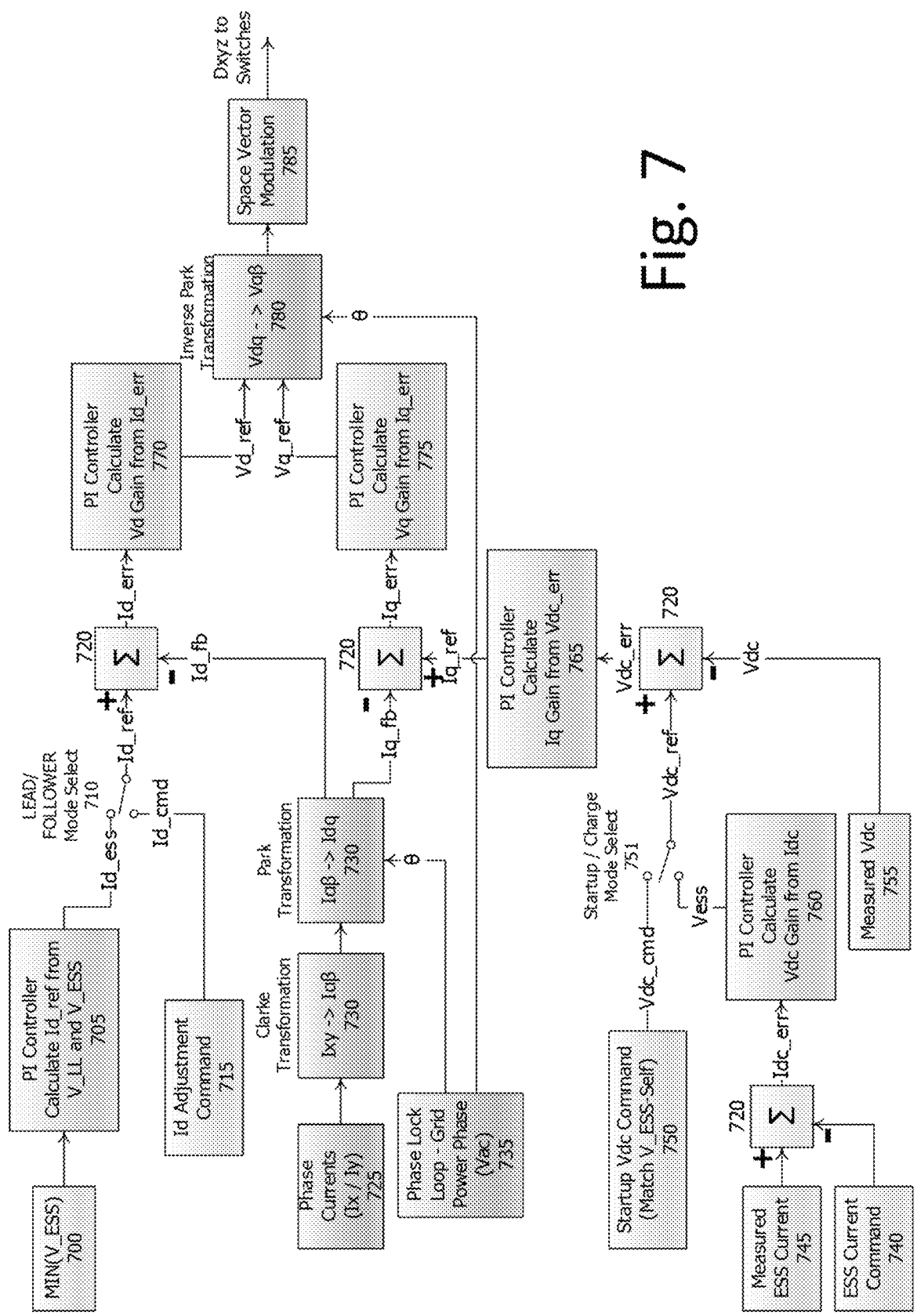
FIG. 7 is a diagram showing an example of the control for field weakening, system DC bus voltage regulation and charging the energy storage system in accordance with aspects of the disclosure.

At S518, the charger controller (lead) 120A, receives the in-vehicle communication and causes the set amount of reactive current to flow through the inductors. For example, the charger controller (lead) 120A will control the conversion electronics 425 to provide the determined reactive current Id such as shown in FIG. 7. For example, the charger controller (lead) 120A may control the gates of the respective switches such that the switches open and close as appropriate.

After S518, S504 is repeated by the charger controller (lead) 120A to determine V_LL and V_ESS_Min. V_ESS_Min is the same determined previously and V_LL is newly determined from the measurements of the phases at terminals 402. S512 is repeated. If V_LL is still larger than V_ESS_Min (or within the margin), field weakening is still needed and controller data is transmitted/received at S506 and S512, S512, S516, S517, S518 and S504 are repeated.

If field weakening is no longer needed ("NO" at S512), then the internal fleet controller (active) 122A instructs the charger controller (lead) 120A to determine whether the ESS 20 in the vehicle is fully charged at S520 (its own ESS). Fully charged may be defined as less than 100% but above a predefined threshold voltage. This predefined threshold may be stored in the charger controller 120 (lead or follower). At S520, the charger controller (lead) 120A receives the real time voltage of the ESS 20 (such as via CAN) or measures the same. The charger controller (lead) 120A may compare the current voltage with the predefined threshold voltage. When the current voltage is less than the predefined threshold voltage, the charger controller (lead) 120A proceeds to S522 and regulates the DC_link voltage to equal the current ESS voltage (S522), closes the contactors and charges the ESS (S524)

However, when the current voltage is greater than (or equal to) the predefined threshold voltage, the charger controller (lead) 120A may issue a notification to the internal fleet controller (active) 122A that charging is done.

At S526, the internal fleet controller (active) 122A determines whether all of the ESS in vehicles within the vehicle group 2 are fully charged. This determination may be made based on the controller data received from charger controllers (follower) 120B within the charging group 2 or specific notifications of fully charged from the same. When all of the ESS's are fully charged, the internal fleet controller (active) 122A issues an end charge command to each of the charger controllers (follower) 120B within the charging group 2 at S528 via the communication interface otherwise the process returns to S506 followed by S508.

If at S510, the charger controller 120 is set as a follower 120B, the charger controller (follower) 120B repeatedly executed S504 (measures the terminal voltages and receives/measures the ESS voltage) and transmits/receives the controller data and commands to/from the internal fleet controller (active) 122A.

At S530, the charger controller (follower) 120B determines if a command was received from the internal fleet controller (active) 122A via the communication interface to inject reactive current for field weakening (sent at S517).

If the command was received ("YES" at S530), the charger controller (follower) 120B causes the set amount of reactive current Id to flow through the inductors such as shown in FIG. 7 otherwise, the charger controller (follower) 120B periodically measures the terminal voltages (terminal 402) and receives/measures the ESS voltage at S504.

After causing the reactive current Id to flow through the inductors, the charger controller (follower) 120B also receives the measured terminal voltages (terminal 402) and receives/measures the ESS voltage at S504.

In an aspect of the disclosure, the charger controller (follower) 120B may determine at S532 whether field weakening is still needed for its own vehicle. For example, using the measured terminal voltages (at terminals 402), the charger controller (follower) 120B may determine V_LL and compare the determined V_LL with the received/measured voltage of the ESS (V_ESS_Self). If V_LL is still larger than V_ESS_Self (or within the margin), field weakening is still needed, and controller data is transmitted/received from/to the vehicles in the charging group at S506.

In other aspects of the disclosure, S532 may be omitted and charging beginning only after V_LL is less than V_ESS_Min (including margin).

When V_LL is less than V_ESS_Min (including margin) ("NO" at S532), the charger controller (follower) 120B determines if the ESS is fully charged at S520 in a similar manner as described above. The charger controller (follower) 120B still may transmit/receive the controller data to the vehicle group 2 because even though, field weakening may not be needed for its own charging, other vehicle in the charging group 2 may still need field weakening or new vehicles may enter the charging group 2.

When the V_ESS_Self is less than the predefined threshold voltage, the charger controller (follower) 120B proceeds to S522 and regulates the DC_link voltage to equal the current ESS voltage (S522), closes the contactors and charges the ESS (S524).

However, when V_ESS_Self is greater than (or equal to) the predefined threshold voltage, the charger controller (follower) 120B may issue a notification to the internal fleet controller (active) 122A and wait for a notification or command to end charging.

At S534, the charger controller (follower) 120B determines whether the notification or command to end charging has been received from the internal fleet controller (active) 122A. In response to receipt of the notification or command, the charger controller (follower) 120B ends the charging session at S536 otherwise the process returns to S504 followed by S506. The vehicle may be disconnected from the switchgear/transformer 105.

FIGS. 5A/5B illustrate an example of a charging method where one of the vehicles has an internal fleet controller (active) 122A and the other vehicles have charger controllers (follower) 120B, however, in other aspects of the disclosure, all of the vehicles in a charging group 2 may be set in internal charger controller (follower) 120B and where there is an external fleet controller 132.

Figure 6A:
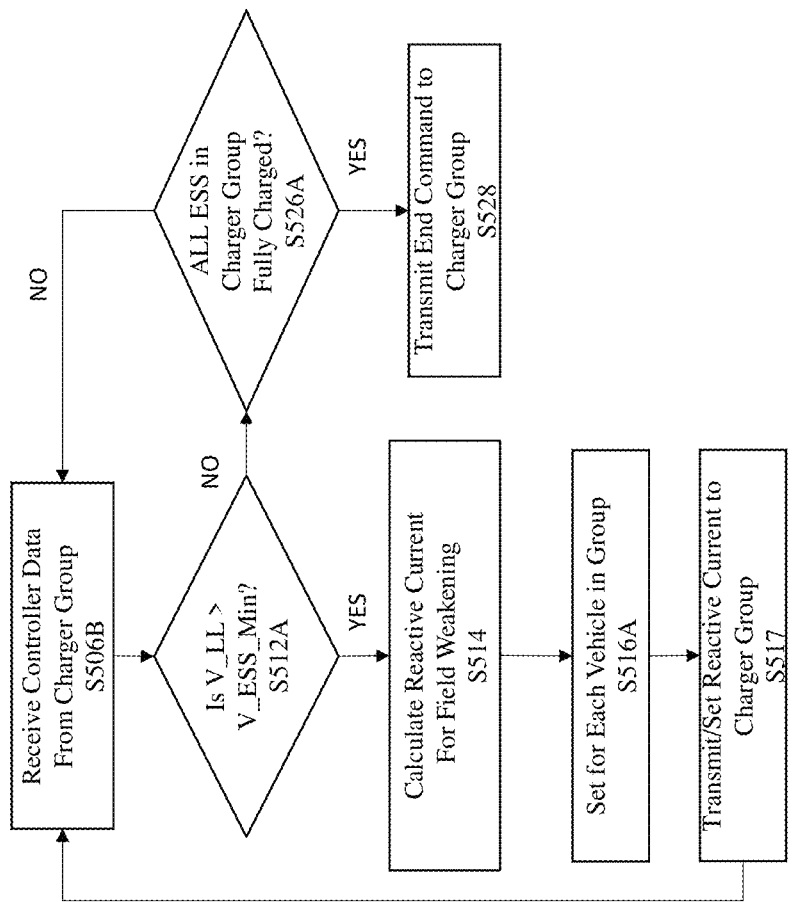
FIGS. 6A and 6B are flow diagrams for charging the energy storage devices within a charging group using field weakening in accordance with other aspects of the disclosure.

FIGS. 6A/6B illustrate an example of a charging method where there is an active external fleet controller 132 (and associated utility controller). The external fleet controller (active) 132 may be in the electric utility distribution 101 as shown in the example in FIG. 2B or in a remote depot controller 150 remote from the vehicles 1 and the electric utility distribution as shown in the example in FIG. 2C.

Figure 6B:
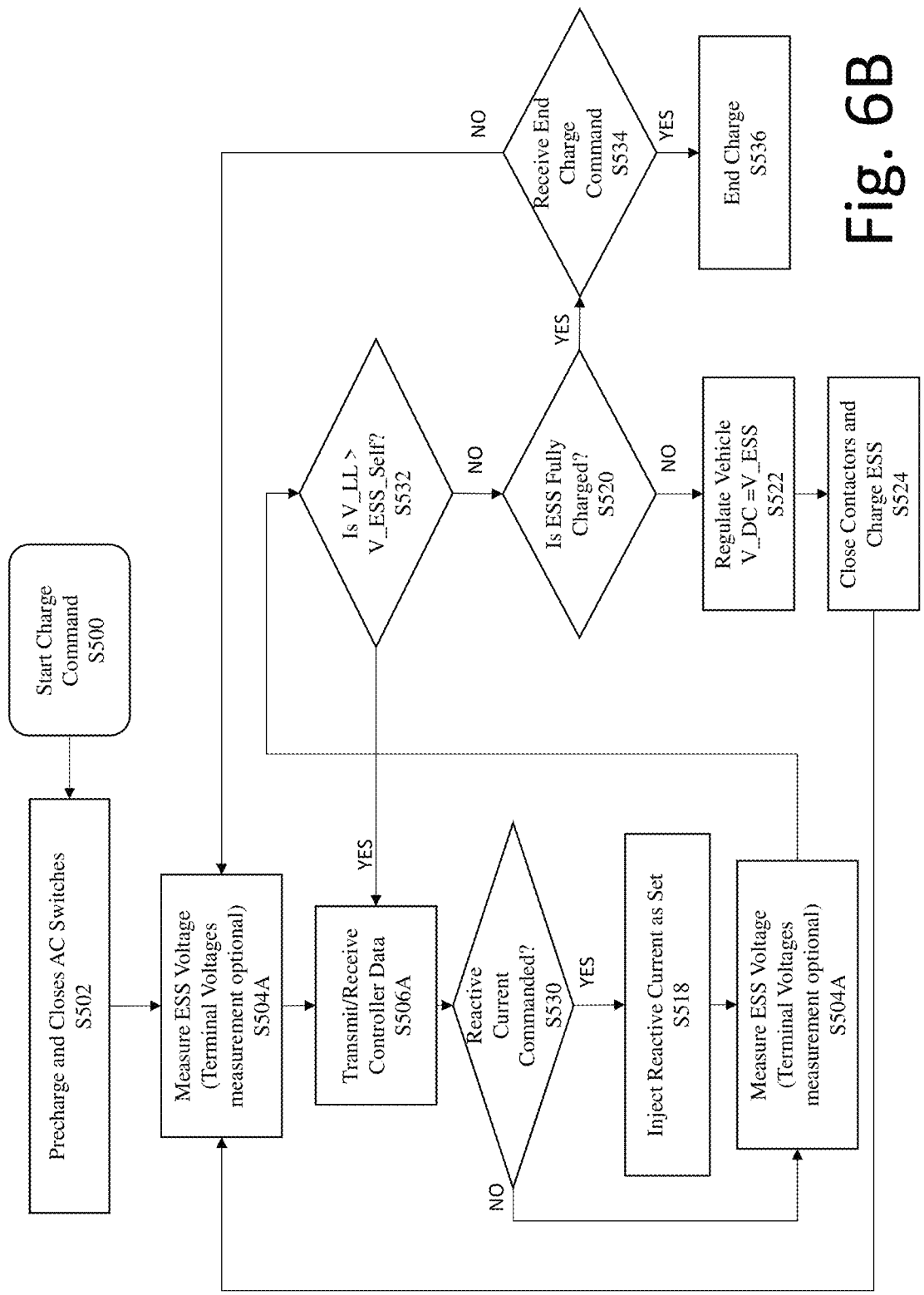

In some aspects of the disclosure, the external fleet controller always is active (when powered). Thus, the selection of the fleet controller may be omitted. In other aspects, the external fleet controller may have a higher selection priority than internal fleet controllers and selection of the active fleet controller may be executed based on the priority (however, the selection is not shown in FIGS. 6A/6B). FIG. 6A illustrates features of the external fleet controller (active) 132 and FIG. 6B illustrates features of the charger controller (follower) 120B.

At S500, a charge command is received by the charger controller (follower) 120B in a similar manner as described above including, but not limited to, receiving from the ESS 20, receiving from the SCU, detecting a connection with the switchgear/transformer 105 and initiating a charging session or directly detecting the V_ESS below a threshold. In other aspects of the disclosure, the external fleet controller (active) 132 in the depot 100 (at the electric utility distribution 101 or at a remote depot controller 150) may select the charger controller (lead) 120A and issue charge command to the charger controller(s) (lead or follower) 120 of the vehicles 1 in the charging group 2. For example, when a vehicle connects to the switchgear 106B and detects which transformer it is connected to, the charger controller 120 may transmit a message to the external fleet controller (active) 132 via the communication interface 124. The message may include a unique identifier of the communication interface 124 and information identifying the switchgear/transformer 105. The message may be a broadcast. In other aspects, if the identifier of the communication interface 124 of the external fleet controller (active) 132 (at the electric utility distribution 101 or at the remote depot controller 150) are already known (e.g., based on a previous connection), the message may be a unicast message to one or more controllers. In an aspect of the disclosure, the identifier(s) of the communication interfaces 124 may be stored in a memory of the charger controller (follower) 120B. In response to receipt of this message, the external fleet controller (active) 132 (at the electric utility distribution 101 or at the remote depot controller 150) may issue the charge command.

In response to the charge command, the charger controller (follower) 120B causes the precharging to occur followed by the closing of the AC switch(es) (and opening the switch in the resistance circuit) at S502.

At S504A, the voltage of the ESS 20 is determined in a similar manner as described above. The voltage is periodically determination. In some aspects of the disclosure, the voltages at terminal 402 are sensed via the voltage sensors 400 e.g., localized voltage. Since, the external fleet controller (active) 132 is on the grid side, it may already know the voltage at the switchgear 106B to determine V_LL and therefore, the voltages at the terminals 402 may not need to be detected. The voltage at the switchgear 106B should be approximately the same as the voltage at terminals 402. In some aspects of the disclosure, voltage sensors are connected to the connection point (ports) on the grid side at the switchgear 106B. When they are not (difference greater than a threshold, the utility controller may isolate a faulty vehicle by controlling the switchgear stage 106B.

At S506A, the charger controller (follower) 120B transmits the controller data to the external fleet controller (active) 132 via the communication interface 124. This controller data includes at least V_ESS. In an aspect of the disclosure, since there is an external fleet controller (active) 132, the controller data may only be sent to the external fleet controller (active) 132 instead of all of the vehicles in the charging group 2. In other aspects, the controller data may be transmitted to all vehicles in the charging group 2.

At 506B, the external fleet controller (active) 132 receives the controller data from each of the vehicles within the charger group 2.

At S512A, the external fleet controller (active) 132 determines whether field weakening is needed. Initially, the external fleet controller (active) 132 determines the minimum current ESS voltage of any ESS of vehicles within the vehicle group 2 (by comparing all received ESS voltage) (V_ESS_Min). The external fleet controller (active) 132 also calculates V_LL associated with the switchgear/transformer 105 based on the sensed voltage at the connection point (ports) on the grid side at the switchgear 106B or based on received voltages at the terminals 402.

The external fleet controller (active) 132 compares V_LL with V_ESS_Min. When V_LL is greater than or equal to V_ESS_Min, the external fleet controller (active) 132 may determine that field weakening is needed ("YES at S512A). On the other hand, when V_LL is less than the V_ESS_Min, field weakening is not needed ("NO" at S512A) and the process moves to S526.

A voltage margin VM may also be used. The voltage margin may account for deadtime, controls, switching drop, etc. In this case, when the V_LL is greater than V_ESS_Min voltage minus VM, the external fleet controller (active) 132 determines that field weakened is needed.

At S514A, the external fleet controller (active) 132 determines the amount of field weakening. In an aspect of the disclosure, the reactive current Id needed may be proportional to the difference in the V_LL and the V_ESS_Min. In some aspects of the disclosure, the external fleet controller (active) 132 may have stored (during a calibration) a look-up table having differences in V_LL/V_ESS_Min and the total required Id. Thus, based on the difference, the external fleet controller (active) 132 selected the amount of total reactive current from the LUT.

In other aspects, the total reactive current Id needed may be iteratively determined using a PI controller where the PI controller is incorporated in the external fleet controller (active) 132.

At S516, the external fleet controller (active) 132 determines the reactive current Id per vehicle in the charging group 2. In an aspect of the disclosure, the reactive current Id per vehicle may be the same such that it is determined by dividing the total reactive current Id determined at S514 by the number of vehicles in the charging group 2. In other aspects, the reactive current Id per vehicle may be different. For example, the current voltage or SOC of each ESS may be considered when the external fleet controller (active) 132 determines the reactive current Id per vehicle. In other aspects, only one vehicle may inject the total reactive current.

Once the reactive current Id per vehicle is determined, at S517, the external fleet controller (active) 132 transmits the set amount of reactive current Id to each vehicle within the charging group 2. In some aspects, where the set amount is the same, it may be a broadcast to all vehicles in the charging group 2. However, in other aspects, where the set amount is different, the instruction may be a unicast to a dedicated vehicle using the unique identifier as the destination. In some aspects of the disclosure, the external fleet controller (active) 132 transmits the determined V_LL to each vehicle within the charging group 2.

S506B, S512A, S514, S516 and S517 are repeated until field weakening is no longer needed for all of the vehicles in the charging group 2.

At S530, the charger controller (follower) 120B determines if a command was received from the external fleet controller (active) 132 via the communication interface 124 to inject reactive current for field weakening (sent at S517).

If the command was received ("YES" at S530), the charger controller (follower) 120B causes the set amount of reactive current Id to flow through the inductors such as shown in FIG. 7 otherwise, the charger controller (follower) 120B periodically measures receives/measures the ESS voltage at S504A (and optionally the voltage at terminals 402).

After causing the reactive current Id to flow through the inductors, the charger controller (follower) 120B continues to receive/measure the ESS voltage at S504A (and optionally the voltage at terminals 402).

In an aspect of the disclosure, the charger controller (follower) 120B may determine at S532 whether field weakening is still needed for its own vehicle. For example, using received V_LL or the measured terminal voltages (at terminals 402), the charger controller (follower) 120B may determine V_LL and compare the determined V_LL with the received/measured voltage of the ESS (V_ESS_Self). If V_LL is still larger than V_ESS_Self (or within the margin), field weakening is still needed, and controller data is transmitted/received at S506A.

In other aspects of the disclosure, S532 may be omitted and charging beginning only after V_LL is less than V_ESS_Min (including margin).

When V_LL is less than V_ESS_Min (including margin) ("NO" at S532), the charger controller (follower) 120B determines if the ESS is fully charged at S520 in a similar manner as described above. In in above, the charger controller (follower) 120B still may transmit/receive the controller data since other vehicles in the group may still require field weakening or new vehicles may join the charging group 2.

When V_ESS_Self is less than the predefined threshold voltage, the charger controller (follower) 120B proceeds to S522 and regulates the DC_link voltage to equal the current ESS voltage (S522), closes the contactors and charges the ESS (S524)

However, when V_ESS_Self is greater than (or equal to) the predefined threshold voltage, the charger controller (follower) 120B may issue a notification to the external fleet controller (active) 132 and wait for a notification or command to end charging.

At S526, the external fleet controller (active) 132 determines whether all of the ESS in vehicles within the charging group 2 are fully charged. This determination may be made based on the V_ESS of the ESS's received from charger controllers (follower) 120B within the charging group 2. When all of the ESS's are fully charged, the external fleet controller (active) 132 issues an end charge command to each of the charger controllers (follower) 120B within the charging group 2 at S528 via the communication interface 124 otherwise the process returns to S506B followed by S512A for the external fleet controller (active) 132.

At S534, the charger controller (follower) 120B determines whether the notification or command to end charging has been received from the external fleet controller (active) 132. In response to receipt of the notification or command, the charger controller (follower) 120B ends the charge at S536 otherwise the process returns to S504A followed by S506A. The vehicle may be disconnected from the switchgear/transformer 105.

At S534, the charger controller (follower) 120B determines whether the notification or command to end charging has been received from the external fleet controller (active) 132. In response to receipt of the notification or command, the charger controller (follower) 120B ends the charge at S536 otherwise the process returns to S504A followed by S506A. The vehicle may be disconnected from the switchgear/transformer 105.

At S534, the charger controller (follower) 120B determines whether the notification or command to end charging has been received from the external fleet controller (active) 132. In response to receipt of the notification or command, the charger controller (follower) 120B ends the charge at S536 otherwise the process returns to S504A followed by S506A. The vehicle may be disconnected from the switchgear/transformer 105.

At S534, the charger controller (follower) 120B determines whether the notification or command to end charging has been received from the external fleet controller (active) 132. In response to receipt of the notification or command, the charger controller (follower) 120B ends the charge at S536 otherwise the process returns to S504A followed by S506A. The vehicle may be disconnected from the switchgear/transformer 105.

At S534, the charger controller (follower) 120B determines whether the notification or command to end charging has been received from the external fleet controller (active) 132. In response to receipt of the notification or command, the charger controller (follower) 120B ends the charge at S536 otherwise the process returns to S504A followed by S506A. The vehicle may be disconnected from the switchgear/transformer 105.

The functions of the utility controller are the same irrespective of the mode such as control of the switchgear and fault detection and isolation. The utility controller 130 may also issue an instruction to the vehicles 1 to approve charging. A dedicated utility controller may be assigned to each group (such as to a switchgear/transformer 105, respectively). There may also be a remote depot controller 150, which may communicate with the dedicated utility controllers 130 such as shown in FIG. 2C (where the remote depot controller is remote in the depot from the controllers in the electric utility distribution 101 and the vehicles 1). For example, the remote depot controller may be responsible when there is a system wide short at the utility side.

FIG. 7 is a diagram showing an example of the control for field weakening, system DC bus voltage regulation and charging the energy storage system in accordance with aspects of the disclosure.

As shown in FIG. 7, the charger controller 120 (either lead charger controller 120A or follower charger 120B) may execute a plurality of PI controls. As shown in FIG. 7, the lead/follower for the charger controller 120 is set with functional mode switch 710 which determines the functions of the respective controller.

The charger controller 120 uses the current Ix and Iy 725, sensed by the current sensors 405, and converts the same into Id and Iq (Id feedback and Iq feedback, respectively) via coordinate transformation 730 such as Clarke and Park transformation. The transformation has two portions: Ixy to Iαβ (Clarke Transformation) and Iαβ to Idq (Park Transformation).

The phase θ of the switchgear/transformer is determined by a phase lock loop PLL 735. In one aspect of the disclosure, voltage sensors 400, may detect the voltage and phase θ. In other aspects of the disclosure, the voltage may be detected by an observer. In another aspect of the disclosure, an alternative method of determining AC input phase may be used.

The PLL outputs the phase θ to the transformation(s) 730, 780. The phase θ is used in the transformation from Iαβ to Idq and Vdq to Vαβ.

In FIG. 7, boxes 700 and 705 are similar to described above for S512, S514 where the minimum voltage (V_ESS_Min) is determined for the charging group 2, V_LL is determined and used to determine the total reactive current needed (Id_ref). Id_ess is the portion of the reactive current determined for the vehicle associated with the charger controller 120. The Id_cmd is the portion of the reactive current determined for a vehicle associated with a fleet controller 122 or 132 (based on the field weakening and this supersedes a calculated Id_ess). Either Id_ess or Id_cmd is supplied to the adder 720 as the Id_ref., which obtains the difference between Id feedback (Id_fb) and the Id_err feed into the PI controller 770. This difference is an Id_err (the error signal). The PI controller 770 outputs a reference voltage Vd_Ref which causes the measured value to reach the set point. The gains Kid and Kpd are selected based on stability constraints and a desired convergence time.

The Vd command to the space vector modulation 785 is generated by transforming the output from the PI controller 610 (Vd_Ref) from Vdq to Vαβ. This transformation also uses the phase θ as described above.

The output of the space vector modulation controls the conversion electronics 425. Prior to closing the DC contactors and charging the ESS 20, the charger controller 120 (lead or follower) regulates the DC link 50 to match the real time ESS voltage at S522.

The regulation includes both a voltage and current control loop. For charging, the mode is set as "Charge". The ESS current command 740 (Iq) is the set point. In an aspect of the disclosure, a measured DC current 745 may be supplied by the ESS 20 to the charger controller 120 (lead or follower) (real time current). Alternatively, in other aspects of the disclosure, the charger controller 120 directly measures the DC current in the ESS.

The measured DC current 745 is subtracted by the ESS current command 740 by adder 720. This generates a Idc_err. The PI Controller 760 (implemented by charger controller 120) outputs a value which is used as a seed for a set point (e.g., Vess) which when charging is equal to V_dc_ref.

The selection between startup/charge mode select 751 is determined by either the fleet controller as a command to the charger controller or decided individually by the charger controller(s). A measurement of the voltage at the terminal of the ESS is obtained at 750 (measured on the DC link). When in a startup mode, the measurement at 755 (converter output) and the ESS should be the same. Thus, initially, the goal is to have the voltages equal. However, when charging, the voltage at the converter terminals (converter output) should be slightly higher than ESS to enable charging. In an aspect of the disclosure, the charger controller in charge mode may change the rectified voltage reference Vd_ref and Vq_ref such that a constant current, constant voltage, etc. ESS charge mode occurs based on the ESS type and state of charge. In an aspect of the disclosure, the fleet controller or the individual charger controller(s) may determine when to select from startup mode to charge mode.

A measured value (measured Vdc 755) (which is the converter output) is subtracted from Vdc ref to generate the error, e.g., Vdc_err. Similar to current, in an aspect of the disclosure, the ESS 20 may notify the charger controller 120 (lead or follower) of the real time voltage or the charger controller 120 may directly sense the real time voltage.

The PI controller 765 outputs a Iq_Ref which causes the measured value to converge to the set point. The gains KiV and KpV are selected based on stability constraints and a desired convergence time. Additionally, Iq_fb is subtracted from Iq_ref to generate the error, e.g., Iq_err in adder 720. The PI controller 775 outputs a Vq_Ref.

The Vq command to the space vector modulation 785 is generated by transforming the output from the PI controller 775 (Vq_Ref) from Vdq to Vαβ.

In an aspect of the disclosure, the charger controller 120 may comprise a processor and memory. Similarly, the fleet controller (external or internal) may comprise a processor and memory.

In accordance with aspects of the disclosure, even after one or more vehicles 1 within a charging group are charging their respective ESS's (because the V_LL is less than V_ESS_Self, respectively, accounting for the VM), the fleet controller continues to receive controller data from the vehicles within the charging group and updates the field weakening for the charging group by adjusting the total reactive current needed. Therefore, charging of the multiple vehicles within the charging group may be safely accomplished.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive aspects have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive aspects described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive aspects described herein. It is, therefore, to be understood that the foregoing aspects are presented by way of example only and that, within the scope of the appended claims and equivalents thereto, inventive aspects may be practiced otherwise than as specifically described and claimed. Inventive aspects of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described aspects of the disclosure can be implemented in any of numerous ways. For example, aspects of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

As used herein, the term "processor" may include a single core processor, a multi-core processor, multiple processors located in a single device, or multiple processors in wired or wireless communication with each other and distributed over a network of devices, the Internet, or the cloud. Accordingly, as used herein, functions, features or instructions performed or configured to be performed by a "processor", may include the performance of the functions, features or instructions by a single core processor, may include performance of the functions, features or instructions collectively or collaboratively by multiple cores of a multi-core processor, or may include performance of the functions, features or instructions collectively or collaboratively by multiple processors, where each processor or core is not required to perform every function, feature or instruction individually. For example, a single FPGA may be used or multiple FPGAs may be used to achieve the functions, features or instructions described herein.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments. As such, one aspect or embodiment of the present disclosure may be a computer program product including least one non-transitory computer readable storage medium in operative communication with a processor, the storage medium having instructions stored thereon that, when executed by the processor, implement a method or process described herein, wherein the instructions comprise the steps to perform the method(s) or process(es) detailed herein.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of components A and B, then there may be inventive subject matter in the combination of A and B, A alone, or B alone, unless otherwise stated herein.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc.

Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various aspects of the disclosure are examples and the disclosure is not limited to the exact details shown or described. The terminology used herein is for the purpose of describing particular aspects only and is not intended to be limiting the scope of the disclosure and is not intended to be exhaustive. Many modifications and variations will be apparent to those of ordinary skill in the art without departing from the scope and spirit of the disclosure.

What is claimed is:

1. An apparatus associated with a charging depot, the charging depot comprising a transformer and a plurality of charging ports, where a plurality of vehicles are respectively connectable to the charging depot to charge respective energy storage devices using power from the transformer via a switchgear, the plurality of vehicles forming a charging group, each vehicle comprising an on-board AC charger, the apparatus comprising:
a communication interface;
a processor configured to:
receive, from the on-board AC charger in at least two vehicles which are connected to a same transformer, via the communication interface, a real-time DC voltage of a respective energy storage system of the at least two vehicles;
determine based on the received DC voltages from the at least two vehicles, a minimum DC voltage among the energy storage system in each of the at least two vehicles;
compare the determined minimum DC voltage with a peak line-line voltage (V_LL) associated with the transformer to determine whether field weakening is needed, when it is determined that field weakening is needed, the processor is further configured to:
calculate a reactive AC current to reduce the peak V_LL associated with the transformer to less than the determined minimum DC voltage; and
transmit, to the on-board AC charger in the at least two vehicles, a value proportional to the calculated reactive AC current, via the communication interface.

2. The apparatus of claim 1, further comprising a plurality of voltage sensors configured to detect a voltage at each of three-phases at the plurality of charging ports and the processor is configured to determine the peak V_LL corresponding to the detected voltage.

3. The apparatus of claim 1, wherein the on-board AC charger comprises voltage sensors to detect voltages at terminals of conversion circuitry in the vehicle, respectively and wherein the processor is further configured to receive the detected voltages from the voltage sensors.

4. The apparatus of claim 1, wherein the real-time DC voltage of the respective energy storage system of the at least two vehicles is received while each energy storage device is coupled to the same transformer and the determination of the minimum DC voltage, whether field weakening is needed, the calculation of the reactive AC current and the transmission of the value proportional to the calculated reactive AC current is repeated based on the received DC voltages.

5. The apparatus of claim 1, wherein the value proportional to the calculated reactive AC current is the same for each of the at least two vehicles.

6. The apparatus of claim 1, wherein when an additional vehicle connects to one of the charging ports, prior to charging, the real-time DC voltage of the energy storage system in the additional vehicle is received and the processor repeats the determination of the minimum DC voltage, whether field weakening is need, calculation of the reactive AC current, and the transmission of the value proportional to the calculated reactive AC current.

7. The apparatus of claim 1, wherein the apparatus is located in the charging depot.

8. The apparatus of claim 1, wherein the communication interface is a wireless communication interface.

9. The apparatus of claim 1, wherein the reactive AC current to reduce the peak V_LL is determined based on proportional integral (PI) control.

10. The apparatus of claim 1, wherein the charging depot has a plurality of transformers and a plurality of sets of charging ports, where a plurality of set of vehicles are connectable to the sets of charging ports, respectively, via respective switchgears, wherein each set of vehicles form a different charging group, each charging group comprises vehicles connected to the same transformer, wherein the processor is configured to calculate the reactive current needed for each charging group based on real-time voltage of the energy storage system in the vehicles in the respective sets and the peak V_LL associated with the respective transformer.

11. An on-board charging system for a vehicle, the vehicle being coupleable to a transformer in a charging depot via a switchgear, where the charging depot comprises a plurality of ports, the transformer being configured to supply three-phase AC for charging the energy storage system in the vehicle, the vehicle being connectable to a port via an AC charging cable, the on-board charging system comprising:
an AC filter comprising an inductor, the AC filter coupleable to each of the three-phase AC;
conversion circuitry coupled to the inductor of each AC filter, the conversion circuitry configured to convert the three-phase AC received at its input terminals into DC for a system DC bus and configured to supply an independently controllable real AC current and reactive AC current;

voltage sensors for detecting a voltage at each of the three-phases at the input terminals, respectively, a communication interface configured to be in electrical communication with at least one other vehicle in a charging group, said charging group including one or more other vehicles coupled to the same transformer;

wherein the on-board charging system further comprises a first processor and a second processor, where the first processor is configured to be set in at least one of an active fleet controller mode and an inactive fleet controller mode, wherein when set in the active fleet controller mode, the processor is an active fleet controller and where, when the first processor is set in the inactive fleet controller mode, the second processor receives a command from the vehicle which is set as the active fleet controller, wherein when the first processor is the active fleet controller, the second processor is configured to close one or more switches associated with each of the three-phases when a condition is satisfied and determine the real-time voltage of the energy storage device in its own vehicle; and the first processor is configured to:

receive from the on-board charging system from the at least one other vehicle in the charging group, a real-time DC voltage of a respective energy storage system of the vehicle, via the communication interface;

determine a minimum DC voltage among the energy storage system in each vehicle connected to the same terminal based on the received real-time DC voltage and the determined real-time voltage of the energy storage device;

determine a peak line-line voltage (V_LL) corresponding to the detected voltage at the input terminals of the conversion circuitry;

compare the determined peak V_LL with the minimum DC voltage to determine whether field weakening is needed, when it is determined that field weakening is needed, the first processor is further configured to:

calculate a reactive AC current to reduce the peak V_LL to less than the minimum DC voltage; and transmit to the on-board charging system of the at least one other vehicle in the charging group, a value proportional to the calculated reactive AC current via the communication interface; and where the second processor is configured to cause a reactive AC current based on the calculated reactive AC current to be supplied by the conversion circuitry such that it flows through each inductor and transformer, reducing the peak V_LL.

12. The on-board charging system of claim 11, wherein the setting of the mode to the active or inactive fleet controller mode is based on a timing when the one or more vehicles in the charging group are connected to the plurality of ports.

13. The on-board charging system of claim 12, wherein the second processor is further configured to:

regulate a system DC bus voltage to substantially match the real-time voltage of the energy storage system after the reactive AC current is injected;

control one or more switches associated with the energy storage system to close when the peak V_LL is less than the real-time voltage of the energy storage system and the system DC bus voltage substantially matches the real-time voltage of the energy storage system; and wherein the energy storage system is charged after the control of the one or more switches.

14. The on-board charging system of claim 13, wherein when the first processor is set to the inactive fleet controller mode, the second processor is configured to transmit the real-time voltage of the energy storage system while the energy storage system is charging and wherein when the first processor is set to the active fleet controller mode, the first processor receives the real-time voltage and repeats the determination of the minimum DC voltage, whether field weakening is needed, the calculation of the reactive AC current and the transmission of the value proportional to the calculated reactive AC current based on the received DC voltage.

15. The on-board charging system of claim 13, wherein when the first processor is set to the active fleet controller mode, the second processor is configured to detect the real-time voltage of the energy storage system in the vehicle while the energy storage system is charging and the first processor is configured to repeat the determination of the minimum DC voltage, whether field weakening is needed, the calculation of the reactive AC current and the transmission based on the detected real-time voltage.

16. The on-board charging system of claim 11, wherein the setting of the mode to the active or inactive fleet controller mode is based on the real-time voltage of each of the energy storage system of the vehicles in the charging group.

17. The on-board charging system of claim 11, wherein when the first processor is set in the active fleet controller mode, the second processor is configured to:

transmit the real-time DC voltage of the energy storage system of the vehicle, via the communication interface;

receive the value proportional to the calculated reactive AC current via the communication interface; and cause a reactive AC current based on the received proportional value to be supplied by conversion circuitry in the on-board charging system such that it flows through each inductor and transformer, reducing the peak V_LL.

18. The on-board charging system of claim 11, wherein the first processor is the second processor.

19. The on-board charging system for a vehicle of claim 18, wherein the processor is further configured to transmit the real-time voltage of the energy storage system while the energy storage system is charging and receive an updated value proportional to the calculated reactive AC current.

20. An on-board charging system for a vehicle, the vehicle being coupleable to a transformer in a charging depot via a switchgear, where the charging depot comprises a plurality of ports, the transformer being configured to supply three-phase AC for charging the energy storage system in the vehicle, the vehicle being connectable to a port via an AC charging cable, the on-board charging system comprising:

an AC filter comprising an inductor, the AC filter coupleable to each of the three-phase AC;

conversion circuitry coupled to the inductor of each AC filter, the conversion circuitry configured to convert the three-phase AC received at its input terminals into DC for a system DC bus and configured to supply an independently controllable real AC current and reactive AC current;

a communication interface configured to be in electrical communication with at least one other vehicle in a charging group, said charging grouping including one or more other vehicles coupled to the same transformer;

and a processor configured to:

transmit a real-time DC voltage of an energy storage system of the vehicle, via the communication interface;

receive a value proportional to a calculated reactive AC current via the communication interface from a vehicle having a processor set to an active fleet controller mode or from a dedicated external fleet controller, the processor set to the active fleet controller mode or the dedicated external fleet controller calculating reactive AC current based on a minimum DC voltage of energy storage systems of vehicles in the charging group and V_LL at the plurality of ports;

cause a reactive AC current based on the received value to be supplied by the conversion circuitry in the on-board charging system such that it flows through each inductor, the switchgear and transformer, thereby reducing the peak V_LL;

after the reactive AC current is injected, regulate a system DC bus voltage to substantially match the real-time voltage of the energy storage system and control one or more switches associated with the energy storage system to close when the peak V_LL is less than the real-time voltage of the energy storage system and the system DC bus voltage substantially matches the real-time voltage of the energy storage system, and wherein the energy storage system is charged after the control of the one or more switches.

* * * * *